(12) United States Patent
Dubertret et al.

(10) Patent No.: US 9,963,633 B2
(45) Date of Patent: May 8, 2018

(54) PROCESS FOR MANUFACTURING COLLOIDAL MATERIALS, COLLOIDAL MATERIALS AND THEIR USES

(71) Applicant: NEXDOT, Romainville (FR)

(72) Inventors: Benoit Dubertret, Paris (FR); Sandrine Ithurria, Paris (FR)

(73) Assignee: NEXDOT, Romainville (FR)

( * ) Notice: Subject to any disclaimer, the term of this patent is extended or adjusted under 35 U.S.C. 154(b) by 123 days.

(21) Appl. No.: 14/576,543

(22) Filed: Dec. 19, 2014

(65) Prior Publication Data

US 2015/0102271 A1   Apr. 16, 2015

Related U.S. Application Data

(63) Continuation-in-part of application No. 13/063,543, filed as application No. PCT/IB2009/053960 on Sep. 10, 2009, now Pat. No. 9,011,715.

(60) Provisional application No. 61/095,978, filed on Sep. 11, 2008.

(30) Foreign Application Priority Data

Jan. 23, 2009   (EP) .................................... 09290048

(51) Int. Cl.
H01B 1/06 (2006.01)
C09K 11/88 (2006.01)

(52) U.S. Cl.
CPC ................................ C09K 11/883 (2013.01)

(58) Field of Classification Search
USPC ........................................ 252/519.4; 977/773
See application file for complete search history.

(56) References Cited

U.S. PATENT DOCUMENTS

| | | |
|---|---|---|
| 2003/0173541 A1 | 9/2003 | Peng et al. |
| 2006/0060998 A1 | 3/2006 | Strouse et al. |
| 2006/0130741 A1 | 6/2006 | Peng et al. |

FOREIGN PATENT DOCUMENTS

| | | |
|---|---|---|
| WO | 03012006 | 2/2003 |
| WO | 03050329 | 6/2003 |

OTHER PUBLICATIONS

Rui si et al., Rare-Earth Oxide Nanoplyhedra, Nanoplates, and Nanodisks, Angew. Chem. Int. Ed. 2005, 44, 3256-3260.*
Chemla et al., Room-temperature excitonic nonlinear-optical effects in semiconductor quantum-well strucutres, vol. 2, No. 7/1985; J. Opt. Soc. Am. B 1155-1173.*
Monodisperse nanocrystals: general synthesis, assembly, and their applications, Xun Wang et al., Chem. Commun., 2007, 2901-2910.*
A new approach to crystallization of CdSe Nanoparticles into Ordered Three-Dimensional Superlattices, Dmitri Talapin et al. Andvanced Materials 2001.*
U.S. Appl. No. 13/063,543, filed Mar. 11, 2011.
Murray et al. "Synthesis and characterization of nearly monodisperse CdE (E = sulfur, selenium, tellurium) semiconductor nanocrystallites"; . Am. Chem. Soc. 1993, 115, pp. 8706-8715.
Hines et al. "Synthesis and characterization of strongly luminescing ZnS-Capped CdSe nanocrystals"; J. Phys. Chem. Us 1996, 100, pp. 468-471.
Xu et al. "Single-crystal metal nanoplatelets : Cobalt, nickel, copper, and silver"; Cryst. growth Design 2007, vol. 7, No. 9; pp. 1904-1911; Sep. 8, 2006.
Todorovsky et al. "Spray-pyrolysis, deep- and spin-coating deposition of thin films and their characterization"; Journal of the University of Chemical Technology and Metallurgy; 2006, vol. 41, pp. 93-96; Feb. 10, 2006.
Ouyang et al. "Multiple Families of Magic-Sized CdSe nanocrystals with strong bandgap photoluminescence via noninjection one-pot syntheses", Journal of Physical Chemistry C; 2008, vol. 112, No. 36; pp. 13805-13811; Jun. 6, 2008.
Wang et al., "Monodisperse Nanocrystals: General Synthesis, Assembly, and Their Applications," Chemical Communications, Feb. 2007, pp. 2901-2910.
Cao et al., "Growth and Photoluminescence Properties of PbS Nanocubes," Nanotechnology, vol. 17, Jun. 2006, pp. 3280-3287.
Talapin et al., "A New Approach to Crystallization of CdSe Nanoparticles into Ordered Three-Dimensional Superlattices," Advanced Materials, vol. 13, No. 24, Dec. 2001, pp. 1868-1871.
Kigel A et al: "PbSe/PbSexSI-xcore-alloyed shell nanocrystals", Materials Science and Engineering C, vol. 25, No. 5-8, Dec. 1, 2005 (Dec. 1, 2005), pp. 604-608, XP025316495.
Nose et al: "Chemical role of amines in the colloidal synthesis of CdSe quantum dots and their luminescence properties", Journal of Luminescence, vol. 126, No. 1, Apr. 26, 2007 (Apr. 26, 2007), pp. 21-26, XP022048858.
Asinski et al: "Rapid oxidation of InP nanoparticles in air", Solid State Communications, vol. 141, No. 11, Feb. 13, 2007 (Feb. 13, 2007), pp. 624-627, XP005886216.
Takahisa Omata et al.: "Synthesis of CdSe Quantum Dots Using Micro-Flow Reactor and Their Optical Properties", Japanese Journal of Applied Physics, vol. 44, No. 1A, Jan. 11, 2005 (Jan. 11, 2005), pp. 452-456, XP002573190.
Sandrine Ithurria et al.: "Quasi 2D Colloidal CdSe Platelets with Thicknesses Controlled at the Atomic Level", J. AM. Chem. Soc., vol. 130, No. 49, Nov. 14, 2008 (Nov. 14, 2008), pp. 16504-16505, XP002573191.
Sigman, et al.; Solventless Synthesis of Monodisperse Cu2S Nanorods, Nanodisks, and Nanoplatelets, 2003, JACS, 125, 16050-16057.

(Continued)

Primary Examiner — Monique Peets
(74) Attorney, Agent, or Firm — Young & Thompson

(57) ABSTRACT

A colloidal material including semiconductor nanocrystals of formula AnXm, wherein A is selected from group Ib, IIa, IIb, IIIa, IIIb, IVa, IVb, Va, Vb, VIb, VIIb, VIII, IIb, III, IV or mixtures thereof, X is selected from group Va, VIa, VIIa or mixtures thereof, and n and m are independently a decimal number from 0 to 5. The semiconductor nanocrystals have a quasi 2D structure, wherein the smallest dimension is smaller than the other two dimensions by a factor of at least 1.5 and the faces substantially normal to the smallest dimension consist either of A or X. Also, a semiconducting thin film, an optoelectronic device, a laser, a photovoltaic cell, a diode, a light emitting diode or a display including the colloidal material.

16 Claims, 7 Drawing Sheets

(56) References Cited

OTHER PUBLICATIONS

Yong, et al.; J. Phys. Chem. C 2007, 111, 2447-2458.
Yin, et al.; "Colloidal Nanocrystal Synthesis and the Organic-Inorganic Interface"; Nature Publishing Group; pp. 664-670; Sep. 29, 2005.
Hu, et al; "Chemistry and Physics in One Dimension: Synthesis and Properties of Nanowires and Nanotubes"; Accounts of Chemical Research vol. 32, No. 5; pp. 435-445; Sep. 24, 1998.
Geim et al. "The rise of graphene"; Nature Materials 2007, 6, pp. 183-191.
Murray et al. "Synthesis and characterization of nearly monodisperse CdE (E= sulfur, selenium, tellurium) semiconductor nanocrystallites"; . Am. Chem. Soc. 1993, 115, pp. 8706-8715.
Duan et al. "General synthesis of compound semiconductor nanowires"; Adv. Mater. 2000, 404, pp. 298-302.
Peng et al. "Shape control of Cdse nanocrystals"; Nature 2000, 404, pp. 59-61.
Morales et al. "A laser ablation method for the synthesis of crystalline semiconductor nanowires"; Science 1998, 279, pp. 208-211.
Jun et al. "Shape control of semiconductor and metal oxide nanocrystals through nonhydrolytic colloidal routes"; Angrew Chem. Int. edit. 2006, 45, pp. 3414-3439.
Michalet et al. "Quantum dots for live cells, in vivo imaging, and diagnostics"; science 2005, 307, pp. 538-544.
Hines et al. "Synthesis and characterization of strongly luminescing ZnS—Capped CdSe nanocrystals"; J. Phys. Chem. Us 1996, 100, pp. 468-471.
Redl et al. "Three-dimensional binary superlattices of magnetic nanocrystals and semiconductor quantum dots"; Nature 2003, vol. 423, pp. 968-971; Jun. 26, 2003.
Caruge et al. "Colloidal quantum-dot light-emitting diodes with metal-oxide charge transport layers"; Nat. Photonics 2008, vol. 2, pp. 247-250; Apr. 2008.
Puntes et al. "Synthesis of hcp-Co nanodisks"; J. Am. Chem. Soc.; Jun. 11, 2002, 124, pp. 12874-12880.
Xu et al. "Single-crystal metal nanoplatelets: Cobalt, nickel, copper, and silver"; Cryst. growth Design 2007, vol. 7, No. 9; pp. 1904-1911; Sep. 8, 2006.
Si et al. "Rare-earth oxide nanopolyhedra, nanoplates, and nanodisks"; Angrew. Chem. Int. Edit. 2005, 44, pp. 3256-3260.
Sigman et al. "Solventless synthesis of monodisperse Cu2S nanorods, nanodisks, and nanoplatelets"; J. Am. Chem Jul. 31, 2003, 125, pp. 16050-16057.
Ghezelbash et al. "Solventless synthesis of nickel sulfide nanorods and triangular nanoprims"; Nano Letters 2004, No. 4, pp. 537-542; Apr. 2004.
Yang et al. "Synthesis of CdSe and CdTe nanocrystals without precursor injection"; Angew. Chem. Int. edit. 2005, 44, pp. 6712-6715.
Kim et al. "Optical-properties of zinc-blende CdSe and Zn(X)Cd(1-X)Se films grown on gaas"; Phys. Rev. B 1994, vol. 49, pp. 7262-7270; Mar. 15, 1994.
Norris et al. "Measurement and assignment of the size-dependent optical spectrum in CdSe quantum dots"; Phys. Rev. B 1996, vol. 53, pp. 16338-16346; Jun. 15, 1996.
Bastard et al. "Low-temperature exciton trapping on interface defects in semiconductor quantum wells"; Phys. rev. B 1984, vol. 29, pp. 7042-7044; Jun. 15, 1984.
Houtepen et al. "The hidden role of acetate in the PbSe nanocrystal synthesis"; J. Am. Chem. Soc. 2006, vol. 128, pp. 6792-6793.
Mahler et al. "Towards non-blinking colloidal quantum dots"; nature 2008, vol. 7, pp. 659-664; Aug. 2008.
Vandermerwe et al. "Crystal Interfaces; Part II. Finite Overgrowths"; Journal Applied Physics 1963, 34, pp. 123-127; Jan. 1963.
Bryant et al. "Excitons in quantum boxes: Correlation-effects and quantum confinement."; Phys. Rev. 1988, vol. 37, pp. 8763-8772; May 15, 1988.
Nakamura et al. "Size-dependent radiative decay of excitons in CuCl semiconducting quantum spheres embedded in glasses"; Physical Review B. 1989, vol. 40, No. 12, pp. 8585-8588; Oct. 15, 1989.
Chemla et al. "Room-temperature excitonic nonlinear-optical effects in semiconductor quantum-well structures"; J. Opt. Soc. Am. B-Opt Phys. 1985, vol. 2, No. 7; pp. 1155-1173.
Faist et al. "Quantum cascade laser"; Science 1994, vol. 264, No. 5158; pp. 553-556; Apr. 22, 1994.
Han et al. "Quantum-dot-tagged microbeads for multiplexed optical coding of biomolecules"; Nature Publishing Group 2001, vol. 19, pp. 631-635; Jul. 2001.
Wu et al. "Synthesis and photovoltaic application of copper(I) sulfide nanocrystals"; Nano Letters; 2008, vol. 8, pp. 2551-2555; Jun. 24, 2008.
Todorovsky et al. "Spray-pyrolysis, deep-and spin-coating deposition of thin films and their characterization"; Journal of the University of Chemical Technology and Metallurgy; 2006, vol. 41, pp. 93-96; Feb. 10, 2006.
Ouyang et al "Multiple Families of Magic-Sized CdSe nanocrystals with strong bandgap photoluminescence via noninjection one-pot syntheses", Journal of Physical Chemistry C; 2008, vol. 112, No. 36; pp. 13805-13811; Jun. 6, 2008.

* cited by examiner

PROCESS FOR MANUFACTURING COLLOIDAL MATERIALS, COLLOIDAL MATERIALS AND THEIR USES

FIELD OF INVENTION

The present invention relates to a process for manufacturing a colloidal material, to colloidal materials obtainable by this process and to uses of said colloidal materials for the manufacture of optic devices.

The colloidal material obtainable by the process of the present invention may be for example CdS, InP, or PbS. Many other examples are given below.

The colloidal materials of the present invention may be used for example for the manufacture of lasers or optoelectronic devices. For example, according to embodiments of the present invention, the colloidal materials of the present invention may be used instead of a MBE or MOCVD semi-conductor materials.

The materials of the present invention are also useful for testing further theories of quantum confinement.

In the following text, the bracketed bolded references GO are references attached to the cited documents and publication also listed in the reference listing after the <<Example>> part of the specification.

BACKGROUND OF INVENTION

Nanometer size inorganic materials exhibit a wide range of electrical and optical properties that depend on composition, size, shape, and surface ligands and are of both fundamental and technological interest as disclosed in Yin, Y. et al., A.P. Colloidal nanocrystal Synthesis and the organic-inorganic interface. Nature 437, 664-670 (2005) [1], in Hu, J. T. et al., C.M. Chemistry and physics in one dimension: Synthesis and properties of nanowires and nanotubes. Accounts Chem Res 32, 435-445 (1999) [2] and in Geim, A. K. et al., The rise of graphene. Nature Materials 6, 183-191 (2007) [3].

Well documented procedures to grow zero dimensional systems as disclosed in Murray, C. B. et al., M.G. Synthesis and Characterization of Nearly Monodisperse CdE (E=S, Se, Te) Semiconductor Nanocrystallites. J Am Chem Soc 115, 8706-8715 (1993) [4], dots, and one dimensional systems as disclosed in Duan, X. F. et al., C.M. General synthesis of compound semiconductor nanowires. Adv Mater 12, 298-302 (2000) [5] and Peng, X. G. et al. Shape control of CdSe nanocrystals. Nature 404, 59-61 (2000) [6], wires and tubes, as colloidal particles in solution have been reported.

In contrast, there are no methods of preparation that yield optically active two dimensional soluble particles.

Yet, ultra-thin films (quantum wells) of II-VI and III-V semiconductors epitaxially grown on substrates by molecular beam epitaxy for example have proven extremely useful for both fundamental studies and a wealth of applications in optoelectronics as disclosed in Weisbuch, C. et al. Quantum Semiconductor Structures: fundamentals and applications. (Academie Press, 1991) [7].

Wires, 2D for films—can be grown in gas phase syntheses on a substrate by molecular beam epitaxy (MBE) and other techniques as disclosed in [7] or from melted clusters by vapor-liquid-solid process as disclosed in Morales, A. M. et al., C.M. A laser ablation method for the synthesis of crystalline semiconductor nanowires. Science 279, 208-211 (1998) [8]. They can also be grown in liquid phase colloidal synthesis in aqueous or non-hydrolytic media as disclosed in Jun, Y. W. et al., J. Shape control of semiconductor and metal oxide nanocrystals through nonhydrolytic colloidal routes. Angew ChemInt Edit 45, 3414-3439 (2006) [9] As for the gas phase approaches, the non hydrolytic liquid phase synthesis, gives access to OD and 1D crystals with controlled nanometric size and shape as disclosed in reference [1], with the advantages that the crystals can be processed more easily for surface chemistry modification as disclosed in Michalet, X. et al., Quantum dots for live cells, in vivo imaging, and diagnostics. Science 307, 538-544 (2005) [10], core/shell synthesis as disclosed in Hines, M. A. et al., P. Synthesis and characterization of strongly luminescing ZnS-Capped CdSe nanocrystals. J Phys Chem-Us 100, 468-471 (1996) [11], directed assembly as disclosed in Redl, F. X. et al., S. Three-dimensional binary superlattices of magnetic nanocrystals and semiconductor quantum dots. Nature 423, 968-971 (2003) [12] or incorporation in polymer matrices or nanodevices as disclosed in Caruge, J. M., Halpert, J. E., Wood, V., Bulovic, V. & Bawendi, M. G. Colloidal quantum-dot light-emitting diodes with metal-oxide charge transport layers. Nat. Photonics 2, 247-250 (2008) [13]. Interestingly, 2D semiconductor crystals, so called quantum wells, have been synthesized only by epitaxial growth on substrate using MBE for example.

The synthesis of 2D colloidal nanocrystals, nanoplatelets or nanodisks, is limited to few examples of metal as disclosed in Puntes, V. F. et al., A.P. Synthesis of hep-Co nanodisks. J Am Chem Soc 124, 12874-12880 (2002) [14] and in Xu, R. et al., Y.D. Single-crystal metal nanoplatelets: Cobalt, nickel, copper, and silver. Cryst. Growth Des. 7, 1904-1911 (2007) [15] and lanthanide-oxides as disclosed in Si, R., Zhang, Y. W., You, L. P. & Yan, C. H. Rare-earth oxide nanopolyhedra, nanoplates, and nanodisks. Angew ChemInt Edit 44, 3256-3260 (2005) [16] materials as well as GuS as disclosed in Sigman, M. B. et al. Solventless synthesis of monodisperse $Cu_2S$ nanorods, nanodisks, and nanoplatelets. J Am Chem Soc 125, 16050-16057 (2003) [17] and NiS as disclosed in Ghezelbash, A., Sigman, M. B. & Korgel, B. A. Solventless synthesis of nickel sulfide nanorods and triangular nanoprisms. Nano Letters 4, 537-542 (2004) [18].

The general synthesis principle of monodisperse colloidal nanocrystals is based on the separation of the nucleation and growth stages. When the seed growth is favoured in 1 direction, nanorods are obtained, and 2D crystals are formed when growth is blocked in 1 direction.

While on the paper, things look simple, practically, the synthesis of colloidal nanocrystals of any dimensionality <3 relies on subtle combination of temperature, type and concentration of precursors and ligands (or surfactant), and cannot yet be guided by a precise understanding of the fabrication process at the molecular level.

The major advances in the synthesis of colloidal semiconductor nanocrystals were obtained with CdSe, first in 1993 with the synthesis of quantum dots as disclosed in reference [4], and then in 2000 with the synthesis of nanorods as disclosed in reference [6].

But the processes disclosed in the prior art are very expensive, difficult to be carried out, do not allow an easy synthesis of the colloidal material and do not offer any possibility to obtain a controlled homogenous and reproducible thicknesses of the materials. Further, the structures of the materials obtained with the processes of the prior art are only basic ones (1, 2D), with hazardous and heterogeneous thicknesses and very irregular lateral dimensions (3D).

No prior art successfully addresses these problems.

Thus, there remains a major need of a process that satisfactorily resolves these problems and disadvantages of the prior art.

Definitions

In the present invention, the following terms have the following meanings:

"Nanosheet": refers to a nanometric structure in 2D or quasi 2D which is subsequently interchangeably named nanoplatelet, nanoplate or nanosheet.

SUMMARY OF THE INVENTION

The present invention relates to a colloidal material comprising semiconductor nanocrystals of formula $A_nX_m$, wherein A is selected from group Ib, IIa, IIb, IIIa, IIIb, IVa, IVb, Va, Vb, VIb, VIIb, VIII or mixtures thereof; X is selected from group Va, VIa, VIIa or mixtures thereof; n and m are independently a decimal number from 0 to 5; wherein said semiconductor nanocrystals have a quasi 2D structure, wherein the smallest dimension is smaller than the other two dimensions by a factor of at least 1.5; and wherein the faces substantially normal to the smallest dimension consist either of A or X.

According to one embodiment, the smallest dimension of the semiconductor nanocrystals comprises an alternate of atomic layers of A and X.

According to one embodiment, A is selected from Zn, Cd, Hg, Cu, Ag, Au, Ni, Pd, Pt, Co, Fe, Ru, Os, Mn, Tc, Re, Cr, Mo, W, V, Nd, Ta, Ti, Zr, Hf, Be, Mg, Ca, Sr, Ba, Al, Ga, In, Tl, Si, Ge, Sn, Pb, As, Sb, Bi, Sc, Y, La, Ce, Pr, Nd, Sm, Eu, Gd, Tb, Dy, Ho, Er, Tm, Yb or a mixture thereof, and X is selected from O, S, Se, Te, N, P, As, Sb, F, Cl, Br, I or a mixture thereof.

According to one embodiment, the semiconductor nanocrystals are selected from the group consisting of a IIb-VIa, IVa-VIa, Ib-IIIa-VIa, IIb-IVa-Va, Ib-VIa, VIII-VIa, IIb-Va, IIIa-VIa, IVb-VIa, IIa-VIa, IIIa-Va, IIIa-VIa, VIb-VIa, Va-VI a semiconductor.

According to one embodiment, the semiconductor nanocrystals are selected from CdS, CdSe, CdTe, ZnS, ZnSe, ZnTe, HgS, HgSe, HgTe, HgO, GeS, GeSe, GeTe, SnS, SnSe, SnTe, PbS, PbSe, PbTe, $GeS_2$, $GeSe_2$, $SnS_2$, $SnSe_2$, $CuInS_2$, $CuInSe_2$, $AgInS_2$, $AgInSe_2$, CuS, $Cu_2S$, $Ag_2S$, $Ag_2Se$, $Ag_2Te$ FeS, $FeS_2$ InP, $Cd_3P_2$, $Zn_3P_2$, CdO, ZnO, FeO, $Fe_2O_3$, $Fe_3O_4$, $Al_2O_3$, $TiO_2$, MgO, MgS, MgSe, MgTe, AlN, AlP, AlAs, AlSb, GaN, GaP, GaAs, GaSb, InN, InP, InAs, InSb, TlN, TlP, TlAs, TlSb, $MoS_2$, PdS, $Pd_4S$, $WS_2$ or a mixture thereof.

According to one embodiment, the semiconductor nanocrystals are nanosheets, nanoplates or nanodisks.

According to one embodiment, the semiconductor nanocrystals have a thickness tuned at the atomic level.

According to one embodiment, the semiconductor nanocrystals have a thickness of about 0.3 nm to about 10 mm, about 0.3 nm to about 1 mm, about 0.3 nm to about 100 µm, about 0.3 nm to about 10 µm, about 0.3 nm to about 1 µm, about 0.3 nm to about 500 nm, about 0.3 nm to about 250 nm, about 0.3 nm to about 100 nm, about 0.3 nm to about 50 nm, about 0.3 nm to about 25 nm, about 0.3 nm to about 20 nm, about 0.3 nm to about 15 nm, about 0.3 nm to about 10 nm or about 0.3 nm to about 5 nm.

According to one embodiment, the smallest dimension of the semiconductor nanocrystals is smaller than the other two dimensions by a factor of at least 2; 2.5; 3; 3.5; 4.5 or 5.

According to one embodiment, at least one of the two other dimensions of the semiconductor nanocrystals is ranging from 2 nm to 1 m, 2 nm to 100 mm, 2 nm to 10 mm, 2 nm to 1 mm, 2 nm to 100 µm, 2 nm to 10 µm, 2 nm to 1 µm, 2 nm to 100 nm, 2 nm to 50 nm, 2 nm to 20 nm or 2 nm to 10 nm.

The present invention also relates to a semiconducting thin film, an optoelectronic device, a laser, a photovoltaic cell, a diode, a light emitting diode or a display comprising the colloidal material according to the present invention.

DETAILED DESCRIPTION OF THE INVENTION

Figure 1:
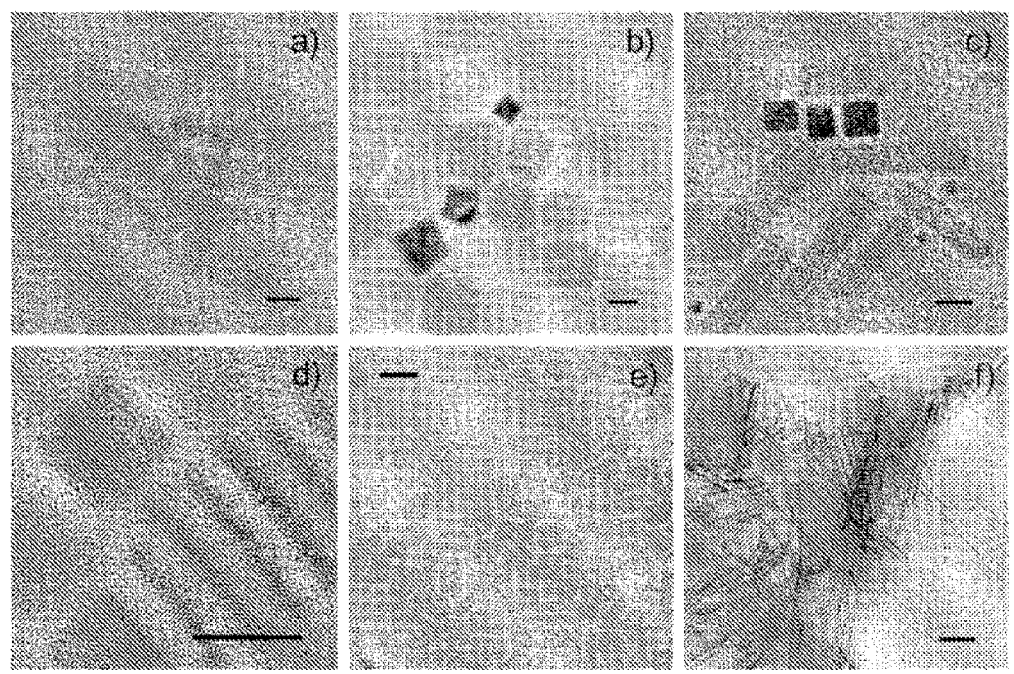
FIG. 1: Transmission Electron Microscopy (TEM) images of CdSe Colloidal platelets nanocrystals synthesized with different methods. a) injection of Zinc acetate (cadmium acetate) at 195° C. and heating at 240° C. for 10 min b) and c) injection of a big quantity of $Cd(Ac)_2$ at 195° C. and heating at 240° C. for 20 min (same as in a) with a second precursor injection at 240° C. and heating for 20 min; d) High resolution TEM of b). e) same as a) using manganese acetate in place of cadmium acetate. f) Cadmium acetate is injected at room temperature with the other precursors prior to heating. Scale bars: (a-d): 10 nm, (e, f): 20 nm.

The present invention successfully addresses among others the above disclosed problems and disadvantages of the prior art which has failed to do.

The process of the present invention is a process for preparing a colloidal material of formula $A_nX_m$, said process comprising:

a first step of reacting together two of the three following reagents in the presence of a non- or weakly-coordinating solvent:
    reagent (i): X or a soluble form of X
    reagent (ii): R'(COOH) or an acetate, propionate or butyrate salt, and
    reagent (iii): $A(R-COO)_p$,
and
a second step of adding the third reagent into the reaction mixture obtained in the first step,
wherein
p is 1, 2 or 3;
R is a linear or branched $C_{1-30}$ alkyl group;
R' is a linear or branched $C_{2-30}$ alkyl group; and
wherein
the choice of reagent (i), (ii) and (iii) is such that
if R is $-CH_3$, $-CH_2-CH_3$ or $-CH_2-CH_2-CH_3$, reagent (ii) is R'(COOH) and if R is a linear or branched $C_{2-30}$ alkyl group, reagent (ii) is an acetate, propionate or a butyrate salt;
and
wherein
X is a metal selected from groups Va or VIa or VIIa of the periodic table;
A is an element selected from groups Ib, IIa, IIb, IIIa, IIIb, IVa, IVb, Va, Vb, VIb, VIIb, VIII of the periodic table; and
A and X are selected respectively from one the following combinations: A from
group IIb, X from group VIa; or A from group IVa, X from group VIa; or A from group Ib and IIIa, X from group VIa; or A from group Ib, X from group VIa; or A from group VIII, X from group VIa; or A from group IIb, X from group Va; or A from group IIIa, X from group VIa; or A from group IVb, X from group VIa; or A from group IIa, X from group VIa; or A from group IIIa, X from group Va; or A from group VIb, X from group VIa; or A from group Va, X from group VIa.

According to one embodiment, X is a metal selected from groups V or VI of the periodic table; A is an element selected from groups II, III or IV of the periodic table; and A and X are selected respectively from one the following combinations: A from group II, X from group VI; or A from group III, X from group V; or A from group IV, X from group VI.

In a first example, this invention provides a process for preparing a colloidal material of formula $A_nX_m$, the process comprising a step of solution phase decomposition of a mixture of X and a carboxylate of formula $A(R-COO)_p$ in the presence of a non- or weakly-coordinating solvent, and a step of injecting an acetate, propionate or butyrate salt or acetic acid, propionic acid or butyric acid in the mixture; wherein A is an element selected from groups Ib, IIa, IIb, IIIa, IIIb, IVa, IVb, Va, Vb, VIb, VIIb, VIII of the periodic table; p is an integer between 1 and 3; R is a linear or branched $C_{1-30}$ alkyl group; X is a metal selected from groups Va, VIa or VIIa of the periodic table; and n and m are such that $A_nX_m$ is a neutral compound; and wherein, in the selection of the pair (A, X), the groups of the periodic table of A and X, respectively, are selected from the following combinations: IIb-VIa, IVa-VIa, Ib-IIIa-VIa, IIb-IVa-Va, Ib-VIa, VIII-VIa, IIb-Va, IIIa-VIa, IVb-VIa, IIa-VIa, IIIa-Va, IIIa-VIa, VIb-VIa or Va-VIa.

In this example, according to the present invention, the process may comprise the steps of:
(a) providing the A carboxylate and X in a non-coordinating solvent,
(b) degassing the mixture obtained in step (a),
(c) heating the degassed mixture obtained in step (b) to a temperature between 100 and 280° C., preferably between 120 and 240° C., thus inducing solution phase decomposition of the mixture of A carboxylate and X, thereby producing a $A_nX_m$ colloidal material,
(d) injecting the acetate, propionate or butyrate salt or acetic acid, propionic acid or butyric acid between steps (a) and (b) or during step (b) or between steps (b) and (c) or during the heating step (c), preferably during step (c), and
(e) recovering the $A_nX_m$ colloidal material which is in the form of platelets.

In this first example, the A carboxylate corresponds to $A(R-COO)_p$, wherein R is a linear or branched $C_{2-30}$ alkyl group, and the acetate, propionate or butyrate salt or acetic acid, propionic acid or butyric acid is respectively a salt of $CH_3COOH$, $CH_3CH_2COOH$, $CH_3CH_2CH_2COOH$ or acid acetic, propionic acid or butyric acid.

According to this example, the process of the present invention comprises a step of solution phase decomposition of a mixture of X and a carboxylate of formula $A(R-COO)_p$ as defined above in the presence of a non- or weakly-coordinating solvent.

In a second example, according to the present invention, the process may comprise the steps of:
(a1) providing the A acetate, propionate or butyrate and carboxylic acid in a non-coordinating solvent
(b1) degassing the mixture obtained in step (a1),
(c1) heating the degassed mixture obtained in step (b1) to a temperature between 100 and 280° C., preferably between 120 and 240° C.,
(d1) injecting X in the heated and degassed mixture of step (c1), thereby producing an $A_nX_m$ colloidal material,
(e1) recovering the $A_nX_m$ colloidal material which is in the form of platelets.

In this second example, the A acetate, $-CH_2-CH_3$ or $-CH_2-CH_2-CH_3$, corresponds to $A(R-COO)_p$, wherein R is $-CH_3$, $-CH_2-CH_3$ or $-CH_2-CH_2-CH_3$ and the carboxylic acid corresponds to R'(COOH), wherein R' is a linear or branched $C_{2-30}$ alkyl group. The injection of X can be done during different times between 1 second and 1 hour, between 1 second and 30 minutes, between 1 second and 20 minutes, between 1 second and 10 minutes or, between 1 second and 30 seconds.

In a third example, according to the present invention, the process may comprise the steps of:
(a2) providing a carboxylic acid and X in a non-coordinating solvent
(b2) degassing the mixture obtained in step (a2),
(c2) heating the degassed mixture obtained in step (b2) to a temperature between 100 and 280° C., preferably between 120 and 240° C.,
(d2) injecting a A acetate, propionate or butyrate in the heated and degassed mixture of step (c2), thereby producing an $A_nX_m$ colloidal material,
(e2) recovering the $A_nX_m$ colloidal material which is in the form of platelets.

In this third example, the A acetate, propionate or butyrate corresponds to $A(R-COO)_p$, wherein R is $-CH_3$, —CH$_2$—CH$_3$ or —CH$_2$—CH$_2$—CH$_3$ and the carboxylicacid corresponds to R'(COOH), wherein R' is a linear or branched C$_{2-30}$ alkyl group.

In a fourth example, according to the present invention, the process may comprise the steps of:

(a3) providing the A acetate, propionate or butyrate and X in a non-coordinating solvent, (b3) degassing the mixture obtained in step (a3), (c3) heating the degassed mixture obtained in step (b3) to a temperature between 100 and 280° C., preferably between 120 and 240° C., (d3) injecting the carboxylic acid between steps (a3) and (b3) or during step (b3) or between steps (b3) and (c3) or during the heating step (c3), preferably during step (c3), thereby producing an A$_n$X$_m$ colloidal material, and (e3) recovering the A$_n$X$_m$ colloidal material which is in the form of platelets.

In this fourth example, the A acetate, propionate or butyrate corresponds to A(R—COO)$_p$, wherein R is —CH$_3$, —CH$_2$—CH$_3$ or —CH$_2$—CH$_2$—CH$_3$ and the carboxylic acid corresponds to R'(COOH), wherein R' is a linear or branched C$_{2-30}$ alkyl group.

In a fifth example, according to the present invention, the process may comprise the steps of:

(a4) providing the A carboxylate in a non-coordinating solvent (b4) degassing the mixture obtained in step (a4), (c4) heating the degassed mixture obtained in step (b4) to a temperature between 100 and 280° C., preferably between 120 and 250° C., and more preferably between 230 and 250° C., (d4) injecting X in the heated and degassed mixture of step (c4), and after a time between 1 and 200 seconds, preferably between 10 and 60 seconds, injecting acetate, propionate or butyrate salt or acetic acid, propionic acid or butyric acid thereby producing an A$_n$X$_m$ colloidal material, (e4) recovering the A$_n$X$_m$ colloidal material which is in the form of platelets.

In this fifth example, the A carboxylate corresponds to A(R—COO)$_p$, wherein R is a linear or branched $_{C2-30}$ alkyl group, and the acetate, propionate or butyrate salt or acetic acid, propionic acid or butyric acid is respectively a salt of CH$_3$COOH, CH$_3$CH$_2$COOH, CH$_3$CH$_2$CH$_2$COOH or acid acetic, propionic acid or butyric acid.

In the present invention, <<periodic table>> refers to the Mendeleiev Periodic Table of the elements.

In the present invention, a <<weakly coordinating solvent>> is a solvent like octadecene which is not a coordinating solvent of metals or semi-conductors. However, the present inventors have noted that the presence of a double bond in a long alkyl chain generates a low complexation of ODE (Octadecene) to the surface of the prepared nanoparticles. According to the present invention, the non-coordinating solvent may be for example octadecene, dichloromethane, tetrahydrofurane (THF), trioctylamine, octadecanal, diesel, oil.

According to the present invention, in A(R—COO)$_p$, R is a linear or branched C$_{1-30}$ alkyl group, preferably a linear or branched C$_{1-20}$ alkyl group, most preferably a linear or branched C$_{4-18}$ alkyl group. For example, the <<C$_1$-C$_{30}$ alkyl-COOH>> may be melissic acid, octacosanoic acid, decanoic acid, undecanoic acid, myristic acid, oleic acid, acetic acid, propionic acid, butyric acid or a mixture thereof.

According to the present invention, the carboxylate R—COO— of reagent (iii), i.e. of A(R—COO)$_p$, may be selected from any carboxylate ions of the above carboxylic acids, for example, from the group comprising acetate, laurate, myristate, palmitate, stearate or a mixture thereof.

For example, the carboxylic acid of step (a1) or (a2) or (d3) may be selected from the group comprising melissic acid, octacosanoic acid, decanoic acid, undecanoic acid, myristic acid, oleic acid, acetic acid, propionic acid, butyric acid or a mixture thereof.

According to the present invention, in R'(COOH) of reagent (ii), R' may be a linear or branched C$_{2-30}$ alkyl group. For example, it may be selected from any carboxylate ions of the above carboxylic acids, for example from the group comprising laurate, myristate, palmitate, stearate or a mixture thereof.

According to the present invention, the acetate salt of reagent (ii) may be a metal acetate salt and/or the acetate salt may be an hydrate or not.

According to the present invention, when in reagent (ii) the acetate salt is a metal acetate salt, the metal, i.e. A, may be selected for example from the group comprising Cd, Mn, Zn, Mg, Co, Na, In or K or a mixture thereof.

According to the present invention, for example, the acetate salt may be selected, for example, from the group comprising cadmium acetate dihydrate, Mn(Ac)$_2$, 4H$_2$O, Zn(Ac)$_2$, Mg(Ac)$_2$, 4H$_2$O, Co(Ac)$_2$, 4H$_2$O or NaAc or a mixture thereof.

According to the present invention, X or a soluble form of X is used in the process. X is a metal selected from groups Va or VIa of the periodic table. For example, X may be selected form the group comprising O, Se, Te, S, N, P, As and Sb or a mixture thereof. When X is in a soluble form, for example in step (d1), it may be solubilized with a solvent selected from the group comprising trioctylphosphine (TOP), tributylphosphine (TBP) primary amines (octylamine, oleylamine, . . . ) and octadecene (ODE), for example TOP or TBP or ODE Te or TOP or TBP or ODE Se or TOP or TBP or ODE S when X is Te or Se or S respectively. Other precursor of X can be used such as S(TMS)$_2$, Se(TMS)$_2$, Te(TMS)$_2$, N(TMS)$_3$, P(TMS)$_3$, As(TMS)$_3$, Sb(TMS)$_3$, Na$_2$O, NaOH, H$_2$O, Na$_2$S, NaSH, H$_2$S, Na$_2$SO$_3$, SO$_2$, Na$_2$Se, NaSeH, H$_2$Se, Na$_2$SeO$_3$, SeO$_2$, Na$_2$Te, NaTeH, H$_2$Te Na$_2$TeO$_3$, TeO$_2$, Na$_3$N, Na$_2$NH, NaNH$_2$, NH$_3$, NaN$_3$, Na3P, Na$_2$PH, NaPH$_2$, PH$_3$, Na$_3$As, Na$_2$AsH, NaAsH$_2$, AsH$_3$, Na3Sb, Na2SbH, NaSbH$_2$, SbH$_3$.

For example for Se, CH$_4$ N$_2$ Se (selenourea) may also be used.

For example for S, CH$_4$N$_2$S (thiourea) may also be used.

In the process of the present invention, the first step, for example step (a) or (a1) or (a2) or (a3) or (a4), is a mixing step. It may be carried out at any suitable temperature allowing the mixture of the carboxylate and X in the non-coordinating solvent. For example, the first step, for example step (a) or (a1) or (a2) or (a3) or (a4), may be carried out at room temperature, e.g. at a temperature below the boiling temperature of the non-coordinating solvent, generally at a temperature from 5 to 100° C., for example from 5 to 90° C., for example from 5 to 60° C., for example from 70 to 90° C., for example at a temperature from 10 to 90° C., for example from 10 to 45° C., preferably from 20 to 30° C.

According to the present invention, the process of the present invention may also comprise a degassing step. This degassing step, for example degassing step (b) or (b1) or (b2) or (b3) or (b4), may be carried out at a pressure below the atmospheric pressure by any means known by the skilled person in the art. This step may be carried out for example at a pressure of from 10 to below 10$^5$ Pa. Preferably the degassing step, for example, (b) or (b1) or (b2) or (b3) or (b4), is carried out until vacuum. The degassing step, for example (b) or (b1) or (b2) or (b3) or (b4), may be carried out at the same temperature as step (a) or (a1) or (a2) or (a3) or (a4) respectively, or at a different temperature. For example, the degassing step may be carried out at a temperature of from 20° C. to 90° C. For example for $Cd(Ac)_2$, degassed or not, the temperature may be from 70° C. to 90° C., for example at 80° C.

According to the present invention, the second step is preferably carried out with an heating of the mixture. The heating step, for example (c) or (e1) or (c2) or (c3) or (c4), may be carried out at any temperature allowing solution phase decomposition of the mixture, for example, in step (c) of X and the carboxylate $A(R\text{—}COO)_p$. For example, the heating step may be carried out at a temperature from 100 to 300° C., for example from 140° to 260° C.

According to the present invention, the second step, also called heating step, for example step (c) or (c1) or (c2) or (c3) or (c4), is preferably carried out under inert atmosphere. Inert atmosphere may be nitrogen, or any other inert gas known by the skilled person.

According to the present invention, the heating step, for example (c) or (c1) or (c2) or (c3) or (c4), may carried out during any suitable time period allowing a solution phase decomposition, for example of the mixture of X and carboxylate $A(R\text{—}COO)_p$. Preferably the heating step is carried out during a time period ranging from 1 minute to 1 hour, preferably from 1 minute to 30 minutes.

According to the present invention, the process of the present invention may also comprise a recovering step, for example the recovering step (e) or (e1) or (e2) or (e3) or (e4). This step may be carried after precipitation of the $A_nX_m$ colloidal material obtained in step (d), respectively (d1) or (d2) or (d3) or (d4). This recovering step may be carried out by any suitable method known by the skilled person, preferably by alcohol precipitation. When alcohol precipitation is used, the alcohol used may be selected, for example from the group comprising methanol, ethanol, propanol or butanol.

Other methods include differential precipitations. For example at the end of the synthesis, oleic acid and hexane may be introduced at room temperature, for example at a temperature of from 15 to 30° C. Polyhedral QDs are soluble in a mixture of hexane and oleic acid, whereas platelets precipitate upon centrifugation. In an other example, the synthesis product may be precipitated with addition of ethanol. After centrifugation, the precipitate may suspend in tetrahydrofuran (THF), Hexane and/or ethanol may be added, for example slowly, until a slightly cloudy mixture is obtained. Centrifugation allows the separation of platelets from QDs. See reference [4] for a detailed description of size selective precipitation.

According to the present invention, the $A_nX_m$ colloidal material recovered at the end of the process of the present invention, for example in step (e) or (e1) or (e2) or (e3) or (e4), is preferably suspended in a solvent which does not react with the $A_nX_m$ colloidal material, for example heptane or hexane, tetrahydrofurane or tetrachloroethylene. Any other equivalent solvent that does not react with the recovered colloidal material may be used.

Any suitable concentrations of reagents (i), (ii) and (iii) may be used as long as the chemical reaction occurs.

For example the molar proportions of A and X may be from 1:100 to 100:1, for example 1:50 to 50:1, for example 1:10 to 10:1 for example 6:1 to 2:1.

Preferably, in the process of the present invention the molar proportion of reagent (ii) and (iii) maybe from 1:1000 to 1000:1, for example 1:50 to 50:1, for example 1:10 to 10:1, for example from 1:6 to 6:1, for example 1:1.

For example, according to the present invention, the solution phase decomposition of the mixture of A carboxylate and X is preferably carried out with molar proportions of the carboxylate $A(R\text{—}COO)p$ and X, i.e. A/X of between 1:99 and 99:1, for example between 20:80 and 80:20, for example between 40:60 and 60:40, for example between 33.3:66.6 and 66.6:33.3, for example between 45:55 and 55:45. For example, the solution phase decomposition of the mixture of carboxylate $A(R\text{—}COO)_p$ and X may be carried out with equimolar or substantially equimolar proportions of A and X or not. The molar proportions are from 1A:1X to 10A:1X, from 1A:1X to 6A:1X, preferably, from 1A:1X to 2A:1X.

In the present invention, <<substantially equimolar>> means substantially stoechiomeric quantities of A and X in the chemical reaction for the preparation of $A_nX_m$ according to the process of the present invention. For example from 0, 01 mmole to 100 mmoles of A and from 0.01 mmole to 100 mmoles of X.

According to the present invention, for example, the solution phase decomposition of the mixture of A carboxylate and X may be carried out with equimolar or substantially equimolar proportions of each of A carboxylate, X and acetate, propionate or butyrate salt.

According to the present invention, in the first above example, the acetate, propionate or butyrate salt is preferably added during heating step (c) when an orange color is observed in the heated mixture. In other words, step (d) is preferably carried out during heating step (c). The introduction during the heating step gives access to platelet population thicker than when the acetate salt is introduced at the beginning of the reaction.

According to the present invention, the acetate, propionate or butyrate salt is preferably added during the heating step, for example heating step (c) or (c1) or (c2) or (c4), when the temperature reaches at least 100° C., for example 180° C., for example 195° C., for example 200° C., for example 205° C., for example 210° C., for example 215° C., for example 220° C. Indeed, injection at high temperature gives access to a wider range of platelet thicknesses.

According to a specific embodiment, the process of the present invention further comprises a step of adding an carboxylic fatty acid, for example between heating step (c) or (c1) or (c2) or (c3) and recovering step (e) or (e1) or (e2) or (e3) respectively. This step permits a better separation between the polyhedral QDs (QDs means "quantum dots") and the platelet shaped QDs, after synthesis.

The process of the present invention allows the manufacture of a colloidal material of formula $A_nX_m$, wherein $A_nX_m$ is as defined above. For example, the present invention is particularly suitable for the manufacture a colloidal material selected from the group consisting of CdSe, CdTe, CdS, InP, $CuInSe_2$, $CuInS_2$, PbSe, PbS, InAs, InSb.

The process of the present invention also allows the manufacture of a colloidal material of formula $A_nX_m$ having quasi 2D structure. For example, the present invention is particularly suitable for the manufacture a colloidal material selected from the group consisting of CdS, CdSe, CdTe, ZnS, ZnSe, ZnTe, HgS, HgSe, HgTe, HgO, GeS, GeSe, GeTe, SnS, SnSe, SnTe, PbS, PbSe, PbTe, $GeS_2$, $GeSe_2$, $SnS_2$, $SnSe_2$, $CuInS_2$, $CuInSe_2$, $AgInS_2$, $AgInSe_2$, CuS, $Cu_2S$, $Ag_2S$, $Ag_2Se$, $Ag_2Te$ FeS, $FeS_2$ InP, $Cd_3P_2$, $Zn_3P_2$, CdO, ZnO, FeO, $Fe_2O_3$, $Fe_3O4$, $Al_2O_3$, $TiO_2$, MgO, MgS, MgSe, MgTe, AlN, AlP, AlAs, AlSb, GaN, GaP, GaAs, GaSb, InN, InP, InAs, InSb, TlN, TlP, TlAs, TlSb, $MoS_2$, PdS, $Pd_4S$, $WS_2$ or a mixture thereof.

For example, the process of the present invention allows the manufacture of CdSe. In this example, the process may comprise, for example, the step of solution phase decomposition of a mixture of a cadmium carboxylate as defined above and selenium in the presence of the non- or weakly coordinating solvent and an acetate salt as defined above too.

According to the present invention, selenium is preferably provided in a form selected from the group comprising Se mesh form, sonicated selenium mesh form, Se dissolved in octadecene, in trioctylphosphine, tributylphosphine, alkyl ammonium seleno carbamate, Selenourea, or an other weakly coordinating solvent. Indeed, any form of reacting Se precursor can be used as a Se source.

According to a particular embodiment of the present invention, an additional carboxylate may be added during the process of the present invention, for example of formula R'''—COO$^-$. This carboxylic fatty acid may be added or injected for example in the mixture of the first or second step.

For example:
between steps (a) or (a1) or (a2) or (a3) or (a4) and (b) or (b1) or (b2) or (b3) or (b4), or
during step (b) or (b1) or (b2) or (b3) or (b4), or
between steps (b) or (b1) or (b2) or (b3) or (b4) and (c) or (c1) or (c2) or (c3) or (c4), or
during the heating step (c) or (e1) or (c2) or (c3) or (c4), preferably during step (c) or (e1) or (c2) or (c3) or (c4), wherein, preferably, R'' is identical or different from R and/or R' and wherein R'' is a linear or branched $C_{1-30}$ alkyl group, preferably a linear or branched $C_{1-20}$ alkyl group, most preferably a linear or branched $C_{4-18}$ alkyl group. For example, these alkyl groups may be as defined in the above description, i.e. selected, independently from R and/or from R', in the group comprising acetate, laurate, myristate, palmitate, stearate or a mixture thereof.

According to this particular embodiment, said carboxylate is preferably injected in an excess molar amount of from 0.1 to 1000% with regard to the quantity of the acetate salt.

According to a particular embodiment, the process of the present invention may comprise an additional step of lateral growth of the colloidal material of formula $A_nX_m$, when said material is in the form of platelets. This means that once the platelets are synthesized, they undergo lateral growth.

This post-synthetic lateral growth may take place in solution. In this case, the platelets may be directly recuperated after their synthesis and placed in suitable conditions for lateral growth. At the end of the synthesis, nanoplatelets may be redispersed in a solvent for example hexane, toluene, THF at a concentration of for example between 1M and 0.2M, for example between 500 μM and 100 μM for example between 501 μM and 10 nM. A part of this solution, for example 10 ml, for example 5 ml, for example 2 ml are placed in a suitable flask, for example in a three neck flask, with 5 ml, 3 ml or 2 ml of a non- or weakly-coordinating solvent for example octadecene and/or trioctylamine.

The flask containing the nanoplatelets may be degassed under vacuum generally at a temperature from 5 to 150° C., for example from 5 to 110° C., for example from 5 to 60° C., for example from 70 to 1100° C., for example at a temperature from 10 to 90° C., for example from 10 to 45° C., preferably from 15 to 30° C. or from 90 to 110° C., A precursor of acetate, a precursor of A and a precursor X are next added to the platelets in order to trigger the lateral growth of the platelets.

These precursors may all be introduced at once in the mixture containing the platelets, for example by introducing them directly in the flask. The flask may then by degassed under vacuum, at a temperature of between 10° C. and 120° C., for example between 15° C. and 60° C., for example between 70° C. and 110° C., for example between 15° C. and 45° C., preferably between 15° C. and 30° C. or between 90° C. and 110° C. The flask may subsequently be put under an inert atmosphere, for example Argon flow, at a temperature of between 80° C. and 240° C., for example between 140° C. and 200° C.

In another variant the precursor of acetate propionate or butyrate and a part of precursor of A are introduced in the mixture containing the platelets, for example in a flask. The flask may then by degassed under vacuum, at a temperature of between 20° C. and 100° C., for example between 30° C. and 80° C., and subsequently put under an inert atmosphere, for example Argon flow, at a temperature of between 80° C. and 240° C., for example between 140° C. and 200° C. Precursor X and the rest of precursor A may then be added to the flask.

Precursors A and X may be introduced as a mixture, optionally in a suitable solvent, for example octadecene and/or trioctylamine. A and X are as previously defined.

The rate of introduction of precursors A and X, for example by injection, may be for example between 10 ml/h and 5 ml/h, for example between 2 ml/h and 0.5 ml/h, for example between 0.1 ml/h and 0.01 ml/h.

The precursor of acetate may be an acetate salt. The acetate salt may be selected, for example, from a group comprising cadmium acetate dihydrate, $Mn(Ac)_2$, $4H_2O$, $Zn(Ac)_2$, $Mg(Ac)_2$, $4H_2O$, $Co(Ac)2$, $4H_2O$ or NaAc or a mixture thereof.

The precursor of propionate may be an propionate salt. The propionate salt may be selected, for example, from a group comprising Cadmium propionate, Manganese propionate, Zinc propionate, Magnesium propionate, Cobalt propionate or Sodium propionate or a mixture thereof.

The precursor of butyrate may be an butyrate salt. The butyrate salt may be selected, for example, from a group comprising cadmium butyrate, Manganese butyrate, Zinc butyrate, Magnesium butyrate, Cobalt butyrate or Sodium butyrate or a mixture thereof.

The molar proportions of precursors A and X in the final mixture may be from 1:100 to 100:1, for example from 1:50 to 50:1, for example 1:2 to 2:1.

The molar proportions of acetate salt and precursor A in the final mixture may be from 1:100 to 100:1, for example 1:50 to 50:1, for example 1:2 to 2:1.

According to the present invention the precursor of A may be a carboxylate $A(R—COO)_p$, as previously defined, or a mixture thereof.

The post-synthetic lateral growth may also be realized on a substrate.

In this case, the lateral growth of the platelets may be realized on substrates having important dimensions, for example dimensions between 1 $mm^2$ and 1 $m^2$. In the context of the invention, by substrate it is meant any material, solid or liquid, flexible or rigid, suitable for use in semiconductors, laser, photovoltaic cells, diodes, Light-Emitting Diode (LED) and on which platelets can grow laterally.

The substrate may be isotropic or composite. The substrate may be selected in a group comprising glass, quartz, mica, silicon, germanium, silicon carbide, tin-indium oxide, titanium oxide, aluminum oxide, iron oxide, titanium, zinc, magnesium, niobium, copper, platinum, iron, aluminum, silver, platinum etc.

In one embodiment, said substrate is chosen among silica, $SiO_2$, aluminum oxide $Al_2O_3$, indium-tin oxide (ITO), fluorine-doped tin oxide (FTO), titanium oxide ($TiO_2$), gold, silver, nickel, molybdenum, aluminum, silicium, germanium, silicon carbide (SiC), graphene, cellulose. silicon dioxide, sapphire, gallium arsenide, an alloy of silicon and germanium, glass and its derivative, plastic material or any material that a person skilled in the art would find suitable.

In another embodiment, the substrate is made of a plastic substrate coated with a conducting material, such as indium tin oxide coating on polyethylene terephthalate.

In another embodiment, the substrate may be form from ZnS, ZnSeInP, CdZnTe, ZnTe, GaSb, or mixture thereof In one embodiment, the substrate may comprise an oxide layer acting as an electronic insulator.

In one embodiment, the substrate may comprise several layers with an oxide layer on the top, such as for example a $SiO_2$ layer on a Si layer.

In one embodiment, the thickness of the oxide layer is from 10 nanometers to 100 micrometers, preferably from 30 nanometers to 1 micrometer, more preferably from 100 nanometers to 1 micrometer.

In one embodiment, the substrate may be rigid or non-rigid. According to a preferred embodiment, the substrate is rigid. According to another embodiment, the substrate is flexible and/or stretchable.

The platelets may be deposited on the substrate in the form of a uniform film. The thickness of the film may be regulated depending on its use. For example, films with thicknesses below 10 nm may be obtained.

The lateral growth rate may be regulated by varying the growth temperature, the rate at which the precursors are introduced for example by injection, and the amount of platelets elongated.

Figure 8:
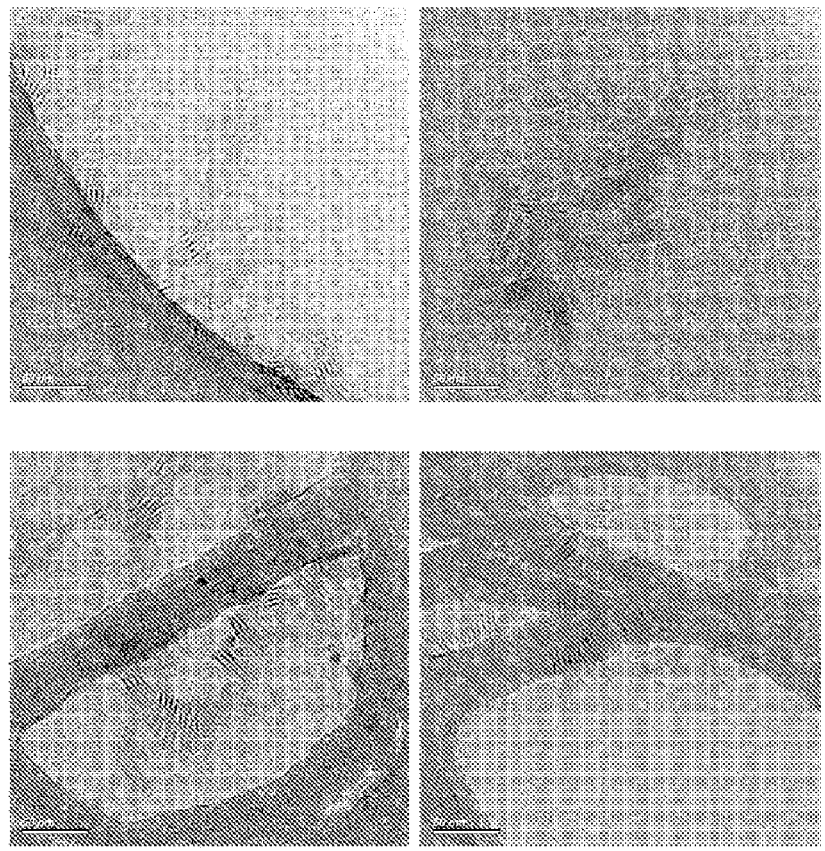
FIG. 8: Transmission Electron Microscopy (TEM) images of CdSe colloidal platelets before lateral growth (example 7) (scale bar 50 nm).
Figure 9:
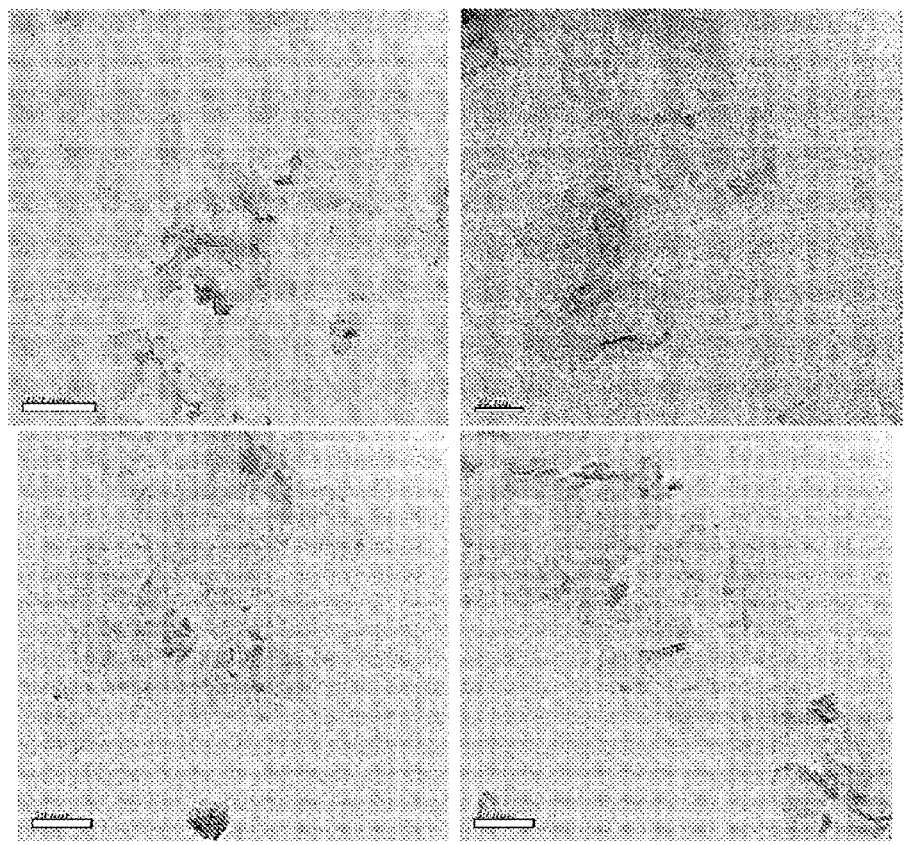
FIG. 9: Transmission Electron Microscopy (TEM) images of CdSe colloidal platelets after lateral growth (example 7) (scale bar 50 nm).

Example 7 and FIGS. 8 and 9 illustrate this particular embodiment.

The present invention relates therefore also to a $A_nX_m$ colloidal material obtainable by the process of the present invention. This has been observed experimentally as shown below.

According to the present invention, the colloidal material may be in the form of nanoplatelets and/or nanocrystals. This has been observed experimentally as shown below. The present inventors demonstrate here, for example, that quasi-2D $A_nX_m$ platelets, for example quasi-2D CdSe platelets, can be synthesized with different thicknesses quantified by a $A_nX_m$ monolayer, for example a CdSe monolayer.

According to the present invention, the colloidal material may be quasi 2D semiconductor crystals. This has been observed experimentally as shown below.

According to the present invention, the $A_nX_m$ colloidal material of the present invention may be selected from the group comprising a II-VI, IV-VI or III-V semiconductor crystal. For example, the material may be CdSe. For example, the present inventors show for the very first time that II-VI cadmium selenide platelets, with thicknesses tuned at the atomic level, can be synthesized in solution.

For example, the CdSe colloidal material may have lateral sizes of between 10 and a few hundred nanometers (for example between 10 and 500 nm, for example between 10 and 200 nm, for example between 5 and 40 nm). In the present invention, "lateral sizes" are the sizes other than the thinnest thickness of the platelets. In other words, the "lateral sizes" of the platelets are the length and/or the width of the platelets. An illustration of this definition is provided in annexed FIG. 4.

In the example of CdSe, the process of the present invention allows to obtain a colloidal material having a thickness less or equal to 10 nm.

According to one embodiment, the CdSe colloidal material obtained by the process of the present invention, preferably the process of the second, third or fourth example, presents at least one fluorescent emission at 460±5 nm According to one embodiment, the CdSe colloidal material obtained by the process of the present invention, preferably the process of the first example, presents at least one fluorescent emission at 510±5 nm. According to one embodiment, the CdSe colloidal material obtained by the process of the present invention, preferably the process of the fifth example, presents at least one fluorescent emission at 550±5 nm According to one embodiment, the CdSe colloidal material obtained by the process of the present invention, preferably the process of the fifth example, presents at least one fluorescent emission at 580±10 nm.

According to one embodiment, the CdTe colloidal material obtained by the process of the present invention, preferably the process of the second example, presents at least one fluorescent emission at 428±5 nm According to one embodiment, the CdTe colloidal material obtained by the process of the present invention, preferably the process of the second example, presents at least one fluorescent emission at 500±5 nm. According to one embodiment, the CdTe colloidal material obtained by the process of the present invention, preferably the process of the second example, presents at least one fluorescent emission at 556±5 nm.

According to one embodiment, the CdS colloidal material obtained by the process of the present invention, preferably the process of the first example, presents at least one fluorescent emission at 382±10 nm. According to one embodiment, the CdS colloidal material obtained by the process of the present invention, preferably the process of the first example, presents at least one fluorescent emission at 413±10 nm According to one embodiment, the CdS colloidal material obtained by the process of the present invention, preferably the process of the first example, presents at least one fluorescent emission at 436±10 nm.

The present invention also relates to a nanoparticular material consisting in a $A_nX_m$ colloidal material, for example any one of those above defined, for example a CdSe colloidal material, according to the present invention.

The present invention also relates to quasi-2D semiconductor nanocrystals, preferably quasi-2D nanoplatelets. According to one embodiment, the quasi-2D semiconductor nanocrystals exhibit at least one of the dimensions, preferably one dimension, namely the thickness, smaller than the other two by a factor of at least 1.5. According to one embodiment, the quasi-2D semiconductor nanocrystals of the present invention have a lateral dimensions (length and/or width) of at least 1.5 times its thickness. According to another embodiment of the invention, the lateral dimensions of the quasi-2D semiconductor nanocrystals are at least 2; 2.5; 3; 3.5; 4.5 and 5 times larger than the thickness. According to one embodiment, the lateral dimensions of the quasi-2D semiconductor nanocrystals are ranging from at least 0.45 nm to at least 50 mm.

According to one embodiment, the colloidal material is inorganic. According to one embodiment, the quasi 2D semiconductor nanocrystals are nanosheets. According to one embodiment, the quasi-2D semiconductor nanocrystals, preferably the nanosheets are anisotropic.

According to one embodiment, the colloidal material comprises semiconductor nanocrystals of formula $A_nX_m$, wherein A is selected from group Ib, IIa, IIb, IIIa, IIIb, IVa, IVb, Va, Vb, VIb, VIIb, VIII or mixtures thereof; X is selected from group Va, VIa, VIIa or mixtures thereof; n and m are independently a decimal number from 0 to 5; said semiconductor nanocrystals have a quasi 2D structure, wherein the smallest dimension, namely the thickness, is smaller than the other two dimensions by a factor of at least 1.5; and wherein the faces substantially normal to the smallest dimension consist either of A or X.

According to one embodiment, the number of monolayer of A is equal to the number of monolayer of X+1. According to one embodiment, the number of monolayer of X is equal to the number of monolayer of A+1.

According to one embodiment, the nanocrystal have lateral dimensions and a vertical dimension having the shortest axis, and the faces substantially normal to the axis of the smallest dimension consist either of A or X.

According to one embodiment, the two outer faces substantially normal to the smallest dimension consist either of A or X ions passivated by a counter ion chemical species.

Figure 4:
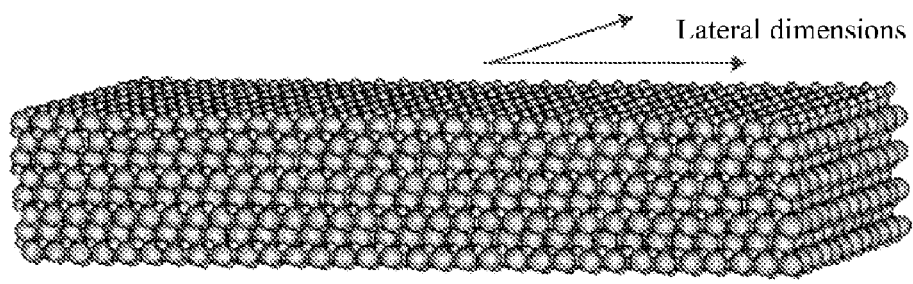
FIG. 4: schematic view of platelets of CdSe obtained with the process of the present invention. This scheme shows clearly what is meant by <<lateral sizes>>.
Figure 5:
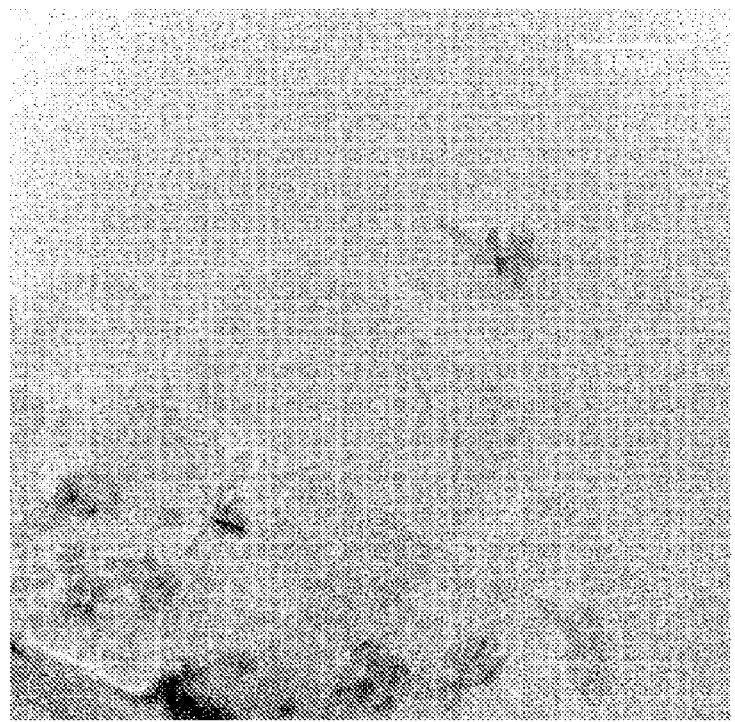
FIG. 5: picture of CdTe synthesized by the process of the present invention. Bane scale: 30 nm.
Figure 10:
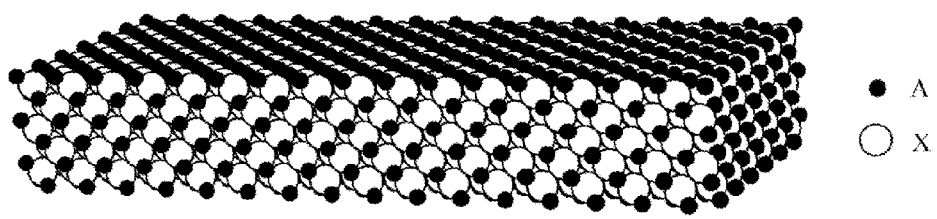
FIG. 10: schematic view of platelets of formula $A_nX_m$ obtained with the process of the present invention. This scheme shows clearly the alternance of atomic layers of A and X along the thickness. In this scheme, faces normal to the thickness (i.e. the smallest dimension) consist of atomic layers of A.

As shown in FIGS. 4 and 10, according to one embodiment of the present invention, the smallest dimension of the semiconductor nanocrystals comprises an alternate of atomic layers of A and X. As depicted in FIGS. 4 and 10 the thickness (i.e. the smallest dimension) consist of atomic layers of A.

According to one embodiment, the quasi 2D semiconductor nanocrystals, preferably the nanosheets have a thickness of about 0.3 nm to about 10 mm, about 0.3 nm to about 1 mm, about 0.3 nm to about 100 μm about 0.3 nm to about 10 μm, about 0.3 nm to about 1 μm, about 0.3 nm to about 500 nm, about 0.3 nm to about 250 nm, about 0.3 nm to about 100 nm, about 0.3 nm to about 50 nm, about 0.3 nm to about 25 nm, about 0.3 nm to about 20 nm, about 0.3 nm to about 15 nm, about 0.3 nm to about 10 nm or about 0.3 nm to about 5 nm.

According to one embodiment, the lateral dimensions of the quasi 2D semiconductor nanocrystals, preferably the nanosheets are ranging from at least 2 nm to less than 1 m, from 2 nm to 100 mm, from 2 nm to 10 mm, from 2 nm to 1 mm, from 2 nm to 100 μnm, from 2 nm to 10 μnm, from 2 nm to 1 μnm, from 2 nm to 100 nm, or from 2 nm to 10 nm. According to one embodiment, at least one of the lateral dimensions of the quasi 2D semiconductor nanocrystals, preferably the nanosheets are ranging from at least 2 nm to less than 1 m, from 2 nm to 100 mm, from 2 nm to 10 mm, from 2 nm to 1 mm, from 2 nm to 100 μnm, from 2 nm to 10 μnm, from 2 nm to 1 μnm, from 2 nm to 100 nm, from 2 nm to 50 nm, from 2 nm to 20 nm or from 2 nm to 10 nm.

According to one embodiment, the colloidal material of the present invention comprises semiconductor nanocrystals of formula $A_nX_m$ wherein A is Zn, Cd, Hg, Cu, Ag, Au, Ni, Pd, Pt, Co, Fe, Ru, Os, Mn, Tc, Re, Cr, Mo, W, V, Nd, Ta, Ti, Zr, Hf, Be, Mg, Ca, Sr, Ba, Al, Ga, In, Tl, Si, Ge, Sn, Pb, As, Sb, Bi, Sc, Y, La, Ce, Pr, Nd, Sm, Eu, Gd, Tb, Dy, Ho, Er, Tm, Yb, or a mixture thereof, X is O, S, Se, Te, N, P, As, Sb, F, Cl, Br, I or a mixture thereof.

n and m are independently a decimal number from 0 to 5, and not simultaneously equal to 0.

According to one embodiment, the colloidal material of the present invention comprises semiconductor nanocrystals of formula $A_nX_m$ wherein A is selected from group Ib, IIa, IIb, IIIa, IIIb, IVa, IVb, Va, Vb, VIb, VIIb, VIII or mixture thereof; and X is selected from group Va, VIa, VIIa or mixture thereof.

According to one embodiment, the colloidal material of the present invention comprises semiconductor nanocrystals selected from the group consisting of a IIb-VIa, IVa-VIa, Ib-IIIa-VIa, IIb-IVa-Va, Ib-VIa, VIII-VIa, Bb-Va, IIIa-VIa, IVb-VIa, IIa-VIa, IIIa-Va, IIIa VIa, VIb-VIa, Va-VIa semiconductor.

According to one embodiment, the colloidal material of the present invention comprises semiconductor nanocrystals chosen among CdS, CdSe, CdTe, ZnS, ZnSe, ZnTe, HgS, HgSe, HgTe, HgO, GeS, GeSe, GeTe, SnS, SnSe, SnTe, PbS, PbSe, PbTe, $GeS_2$, $GeSe_2$, $SnS_2$, $SnSe_2$, $CuInS_2$, $CuInSe_2$, $AgInS_2$, $AgInSe_2$, CuS, $Cu_2S$, $Ag_2S$, $Ag_2Se$, $Ag_2Te$, FeS, $FeS_2$, InP, $Cd_3P_2$, $Zn_3P_2$, CdO, ZnO, FeO, $Fe_2O_3$, $Fe_3O_4$, $Al_2O_3$, $TiO_2$, MgO, MgS, MgSe, MgTe, AlN, AlP, AlAs, AlSb, GaN, GaP, GaAs, GaSb, InN, InP, InAs, InSb, TlN, TlP, TlAs, TlSb, $MoS_2$, PdS, $Pd_4S$, $WS_2$ or a mixture thereof.

According to a particular embodiment of the invention, when the colloidal material obtainable by the process of the present invention is in the form of nanoplatelets, the lateral dimensions, that is the length and the width, of said platelets may be extended further after their synthesis.

When the lateral growth of the platelet stakes place in solution, this leads to a material that may have lateral sizes for example between 10 nm to a few meters, for example 10 nm to 100 mm, for example from 100 nm to 100 micron, for example from 100 nm to 10 micron.

As indicated before, the lateral growth of the platelets may be realized on substrates having important dimensions, for example dimensions of between 1 mm² and 1 m². In this case, the platelets may be deposited on the substrate for example, in the form of a uniform film. The thickness of the film may be regulated depending on its final application. For example, films with thicknesses below 10 nm may be obtained.

The colloidal material $A_nX_m$ of the present invention may be used, for example, for the manufacture of a laser and/or instead of a MBE or a MOCVD semi-conductor material.

The material $A_nX_m$ of the present invention may also be used for the manufacture of or in an optoelectronic device, for example a laser, a photovoltaic cell, a display or a diode.

For example for the diodes applications, see J. M. Caruge, J. E. Halpert, V. Wood V. Bulovic, M. G. Bawendi, Nat. Photonics 2, 247 (April, 2008) [13], wherein the material of the present invention may advantageously be used. For example for the photovoltaic applications, see Y. Wu, C. Wadia, W. L. IIIa, B. Sadtler, A. P. Alivisatos, Nano Letters 8, 2551 (August, 2008) [31], wherein the material of the present invention may advantageously be used. For example for the laser application, see J. Faist, F. Capasso, D. L. Sivco et al., Science 264 (5158), 553 (1994) [29], wherein the material of the present invention may advantageously be used.

Accordingly, the present invention relates also to an optoelectronic device comprising a material according to the present invention.

Accordingly, the present invention relates also to a laser, photovoltaic cell, a Light-Emitting Diode (LED) a diode or a display comprising a material according to the present invention.

The present inventors disclose here a method for the preparation of these new colloidal nanocrystals and characterize them structurally and optically.

As discloses herein, in the example of CdSe, they identified three platelets populations with emission maximum at 462 nm, 513 nm and 550 nm with corresponding thicknesses estimated at 1.9 nm, 2.2 nm and 2.5 nm respectively. Despite the fact that the platelets aspect ratio within a population can range from 4 to several hundreds, the emission spectra full width half maximum (FWHM) of each population is <10 nm at room temperature with quantum yields that can reach 30%.

The platelets that the present inventors have synthesized are an extension of the quantum wells epitaxially grown on substrates, with the advantages that they can be easily synthesized in solution at low cost and used as building blocks for more advanced structures, have uniform thickness that can be tuned within one CdSe monolayer, and finite lateral dimensions ranging for example from 10 nm to few 100 nm.

Another interesting feature of the materials of the present invention, for example these platelets, is their very narrow FWHM at room temperature. These lead to interesting applications like for example the synthesis of beads with optical bar codes as disclosed in Han, M. Y. et al., S. Quantum-dot-tagged microbeads for multiplexed optical coding of biomolecules. Nat Biotechnol 19, 631-635 (2001) [30]. In this application, the material of the present invention may replace the material disclosed in this document. The emission of these platelets should be polarized as in the case of quantum wells. Some applications may also benefit from this property.

This invention is further illustrated by the following examples with regard to the annexed drawings that should not be construed as limiting.

EXAMPLES

Example 1: Manufacture of a CdSe Material According to the Present Invention

All chemicals were purchased from Sigma Aldrich and used without further modifications. Fluorescence emission and excitation spectra were recorded on a Jobin Yvon Fluoromax 3.

Absorption spectra were recorded on a Varian Cary 50 Probe UV-Vis spectrometer. source. TEM images were acquired on a TEM JEOL 2010 with field electron gun. Powder X-ray Diffraction (PXRD) experiments were realized with a Philips X'Pert diffractometer with Cu a source.

The nanoplatelets synthesis in this example is based on the solution phase decomposition of Cadmium myristate and Selenium mesh precursors in the presence of a non-coordinating solvent and an acetate salt.

In this experiment, 170 mg (0.3 mmol) (85 mg (0.15 mmol)) of cadmium myristate, and 12 mg (0.15 mmol) of Se mesh were mixed in 15 ml of octadecene in a three neck flask and degassed under vacuum for 10 minutes. The mixture was then heated at 240° C. under Argon.

When the temperature reached 195° C. (the solution is orange), 55 mg (0.3 mmol) of Zinc acetate (40 mg (0.15 mmol) of cadmium acetate dehydrate) was swiftly introduced in the flask.

After 10 min at 240° C., the reaction was stopped by removal of the heating mantle.

The particles synthesized were isolated by ethanol precipitation and suspended in hexane.

Platelets were separated from polyhedral quantum dots by butanol precipitation and resuspended in hexane.

TEM (TEM JOEL 2010 with field electron gun) observations of the nanoparticles (see annexed FIG. 1a) demonstrate the formation of CdSe platelets with lateral dimensions from 6 nm to 40 nm.

Figure 6:
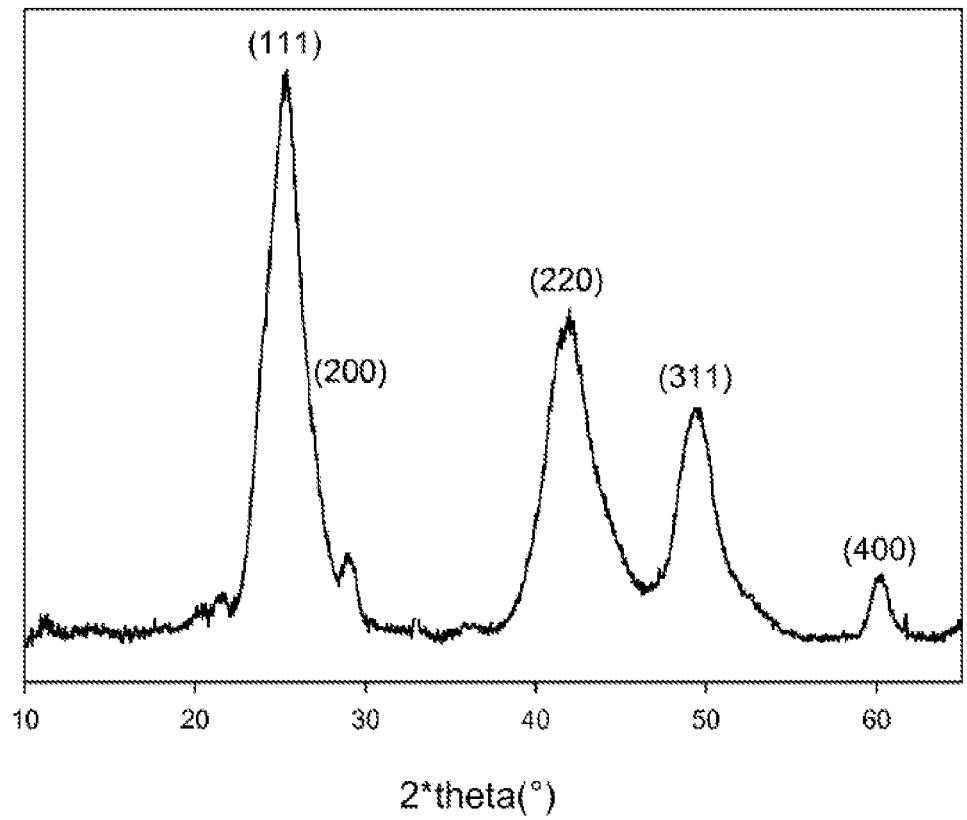
FIG. 6: XRD pattern of CdSe platelets emitting at 510 nm. The standard diffraction peak position of ZB CdSe is indicated.

The platelets have a zinc-blend crystal structure (FIG. 6) which is consistent with the zinc-blend formation of CdSe polyhedra when the same syntheses are used without acetate salt as disclosed in Yang, Y. A. et al., Synthesis of CdSe and CdTe nanocrystals without precursor injection. Angew Chem/nt Edit 44, 6712-6715 (2005) [19].

Figure 7:
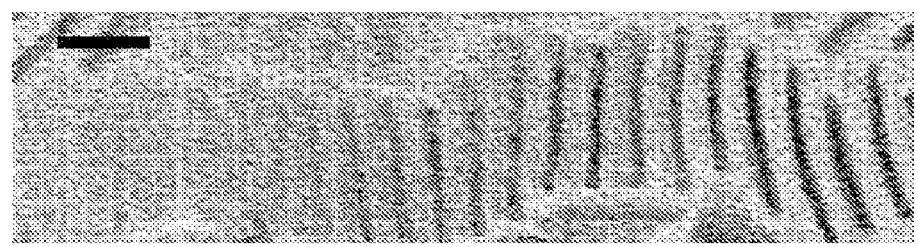
FIG. 7: Transmission Electron Microscopy (TEM) images of CdSe colloidal platelets nanocrystals. The platelets are on their edge on the right hand side of the picture and fall like dominos on their face as we shift to the left of the image (Scale bar 10 nm)

The platelet thickness can be measured when they stack on their edge (FIG. 1d and FIG. 7) and is found to be around 2.2±0.3 nm.

Using TEM images, no difference in the platelet thicknesses could be observed. However, as can be seen on FIG. 1b, when platelets lay flat on the TEM grid, different grey levels are distinguishable, suggesting the synthesis of platelets of different thicknesses.

The platelet formation is induced by the presence of acetate salt in the reaction medium.

Example 2: Manufacture of a CdSe Material According to Example 1 with Different Acetate Salts Other acetate salts have been tested in this example. The experiments were carried out as disclosed in example 1, but the acetate salt used in example 1 has been replaced in different experiments successively by $Mn(Ac)_2 4H_2O$; $Zn(Ac)_2$; $Mg(Ac)_2$, $4H_2O$; $Co(Ac)_2$, $4H_2O$, $Na(Ac)$ or no alternative acetate salt.

These experiments show that the process allows the formation of CdSe platelets, with somewhat different geometries.

In all cases, despite the presence of other metallic ions, elementary analysis indicates that after the washing step, the platelets crystals contained only cadmium and selenium.

When the acetate salt is introduced at the beginning of the synthesis, large CdSe quasi 2D films are obtained (FIG. 1f). These films lateral dimensions can reach the micron and they can fold in rolls or in sheets. Most of them are not soluble in solvents.

When the acetate salt is introduced after the formation of the CdSe crystal seeds smaller CdSe platelets with square or rectangular shape or more complex, faceted planes (FIG. 1a-e) can be obtained.

When no acetate salt is introduced, only polyhedral CdSe quantum dots are obtained.

The inventors have further noted that the shape, aspect ratio, thickness of the platelets can be systematically controlled by varying the reaction time, the injection and growth temperature and the ratios between the cadmium oleate, the acetate salt, and the selenium.

Example 3: Study of the Material of the Present Invention

Figure 2:
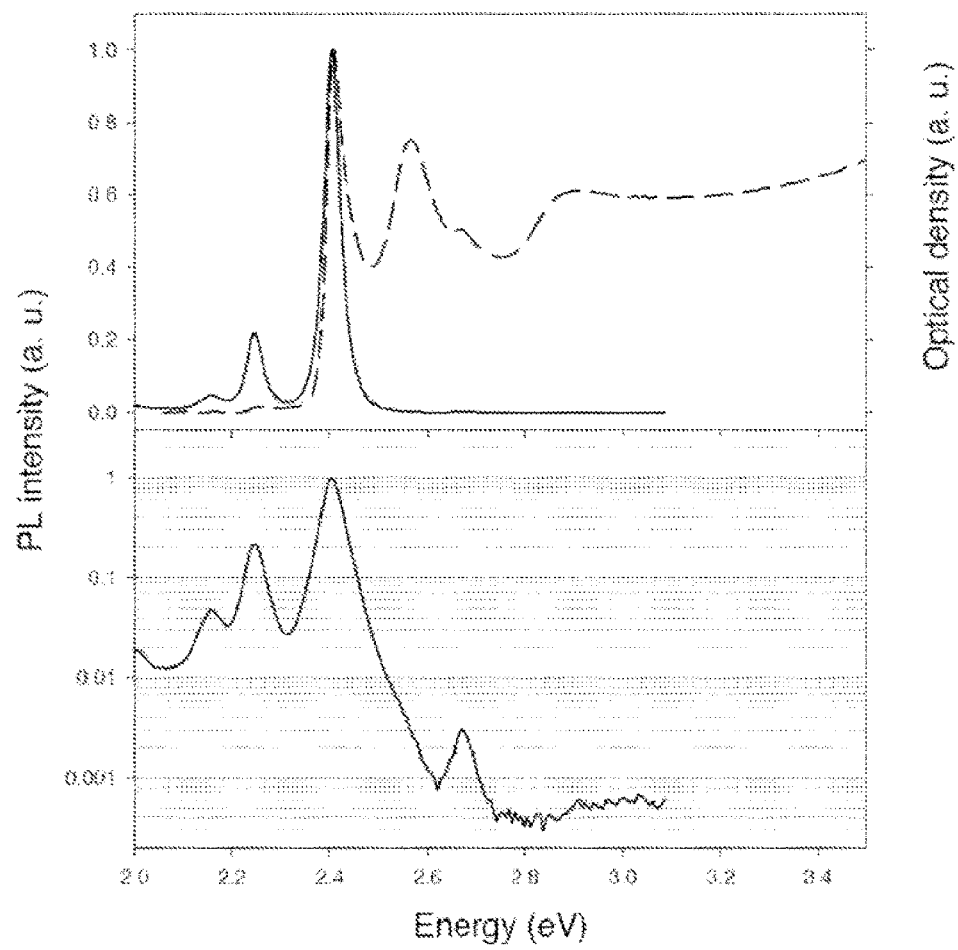
FIG. 2:a) Emission and absorption spectra of a platelet solution in hexane. The sample corresponds to TEM of FIG. 1e). The platelets were isolated from the reaction solution with one ethanol precipitation. b) The same fluorescence emission spectra as in a) plotted in log/linear scale.

The inventors studied the optical properties of the platelets synthesized at room temperature. The emission spectra of the whole solution after the washing step and resuspension in hexane (TEM of FIG. 1a) was measured in a fluorometer Fluoromax 3 JobinYvon™ (see FIG. 2).

The first remarkable feature is that the main fluorescent emission peak, with an emission maximum at 513 nm has a full width half maximum of 41 meV, i.e. 8 nm Quantum dots or quantum rods emitting around 500 nm usually have FWHM between 25 nm and 35 nm, depending on the synthesis. Such narrow FWHM suggests that the nanoparticles emitting at this wavelength are extremely homogeneous in size, at least in the direction responsible for this emission.

The other remarkable feature of the emission spectra (FIG. 2b) is the presence in the solution of four populations (noted hereafter population 1-4) with respective fluorescence maxima at 2.68 eV, 2.42 eV, 2.25 eV, 2.17 eV. The FWHM of populations 1-3 is 41 meV, which is $1.6k_BT$ at 300K.

All the CdSe platelet syntheses the inventors have tested so far produce fluorescent populations that emit with maxima exactly at 2.68±0.01 eV, 2.42±0.01 eV, and 2.25±0.01 eV.

Depending on the synthesis conditions, one population or the other can be obtained in large excess compared to the other, and size selective precipitation can be used to further isolate the sub-populations[4].

Usually, the platelet population emitting at higher energy are less soluble in hexane than the other.

The very narrow FWHM measured in spite of the large lateral platelets size variations observed in TEM images (FIG. 1) implies that the platelet aspect ratio has only little influence on their emission wavelength.

The major difference between the platelets population seems to be their thickness.

Interestingly, both the emission and the absorption spectra of the platelets (FIG. 2a) can easily be interpreted using the model of infinite one-dimensional potential quantum wells. In this framework, the absorption coefficient has a step-like structure [7] with each step at the threshold energy for the nth transition between the heavy hole and the electron:

$$\hbar w_n = E_g + E_{hhn} + E_{en} = E_g \pm \hbar^2 n^2 p^2 / 2 m_{hh}^* d^2 + \hbar^2 n^2 p^2 / 2 m_e^* d^2$$

(Eq. 1) and the luminescence spectrum consist of a peak of spectral width ~$k_BT$ at energy $\hbar w = E_g + E_{hh1} + E_{e1}$, where $E_g$ is the semiconductor bandgap, n is the number of the interband transition, $m_{hh}$ and $m_e^*$ the heavy hole and electron effective mass, and d is the thickness of the quantum well.

Figure 3:
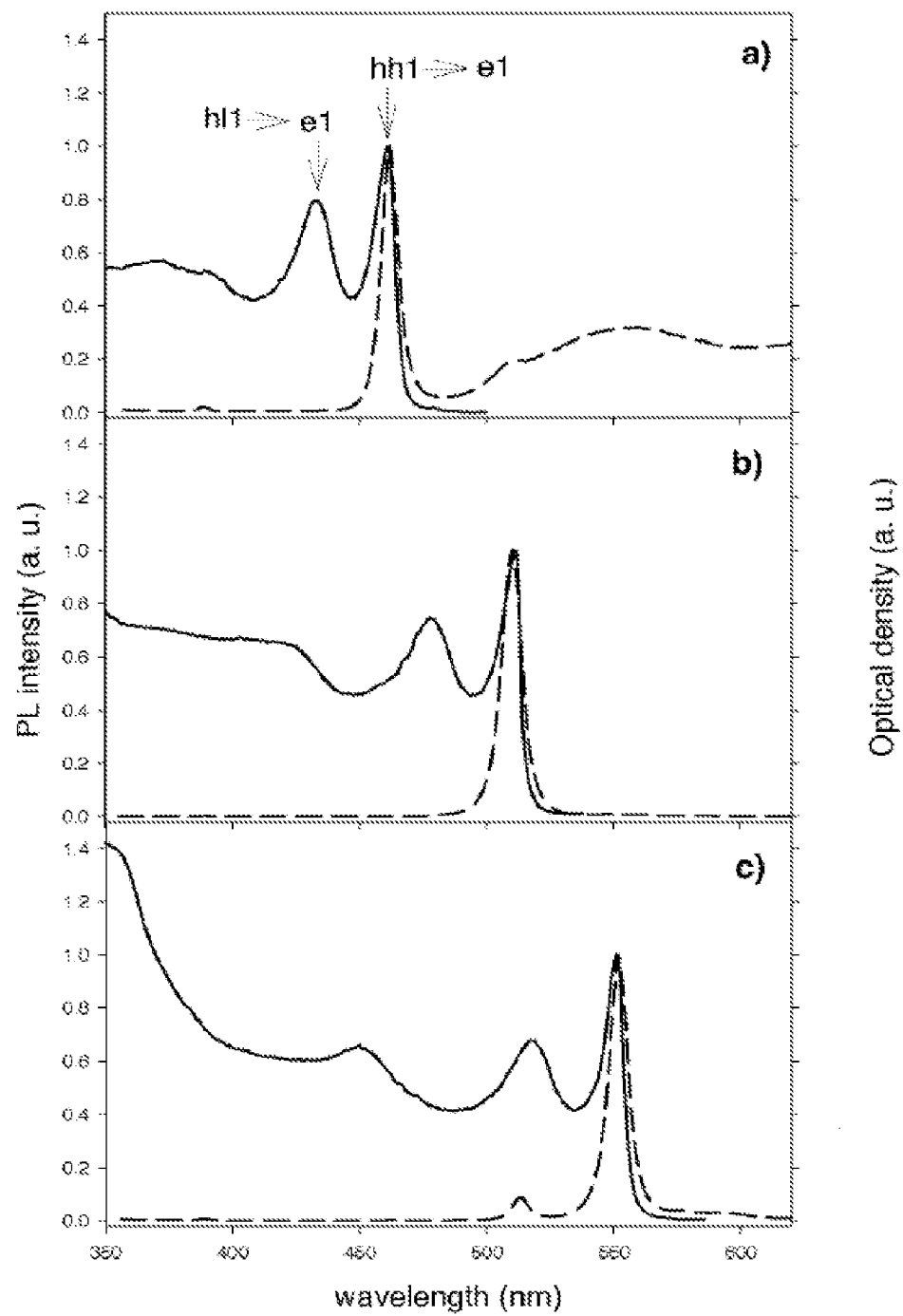
FIG. 3: Emission dash line) and Photo Luminescent Excitation (solid line) spectra of different platelet syntheses. a) Zinc acetate (cadmium acetate) injected at low temperature (195° C.) and heating at 240° C. for 10 min, b) injection of a big quantity of Cd(Ac)2 at 195° C. and heating at 240° C. for 20 min; and c) same as in a) with a second precursor injection at 240° C. and heating for 20 min.

The main features of the absorption spectra presented in FIG. 2a are also present in the photoluminescent excitation (PLE) spectra (FIG. 3) of three different syntheses yielding in excess population 1, 2, or 3.

For each PLE spectra, both the heavy-hole and the light hole transition for n=1 are clearly visible.

Using Eq.1 with n=1 with the following numerical values for zinc-blende CdSe: $E_g$=1.67 eV (see Kim, Y. D. et al. Optical-Properties of Zinc blende Cdse and $Zn_{(X)}Cd_{(1-X)}Se$ Films Grown on Gaas. Phys Rev B 49, 7262-7270 (1994) [20]), $m_e^*$=0.11$m_o$ and $m_{hh}^*$=1.14$m_o$ (Norris, D. J. et al., M.G. Measurement and assignment of the size-dependent optical spectrum in CdSe quantum dots. Phys Rev B 53, 16338-16346 (1996) [21]), the inventors computed the thickness of each platelets population and found d=1.93 nm, 2.24 nm, 2.55 nm. The thinner the platelet, the higher its emission energy. The same operation using the light hole transition and an effective mass of $m_{lh}$=0.31$m_o$ (see reference [21]) gives thickness of d=1.97 nm, 2.25 nm and 2.54 nm.

The good agreement between the two sets of values confirms the attribution of the light hole and heavy hole transition.

The thickness difference between the three populations is 0.31±0.01 nm, almost exactly half the lattice parameter of zinc-blende CdSe crystals (a=0.608 nm). This suggests that the CdSe platelets synthesized by the inventors have thicknesses quantified by one CdSe mono-layer.

The emission spectra for each platelet population have FWHM<10 nm and the Stokes shift between the first exciton and the platelet emission is <10 meV, in contrast with the large Stokes shifts observed for quantum dots and quantum rods. Such small Stokes shift is characteristic of quantum wells with precisely controlled thickness as disclosed in Bastard, G. et al., and M. Law-Temperature Exciton Trapping on interface Defects in Semiconductor Quantum Wells. Phys Rev B 29, 7042-7044 (1984) [22] and suggests that within a platelet population the thickness is indeed precisely controlled. Using Eq. 1 with n=1, the platelets thicknesses can also be deduced from the emission spectra of FIG. 3 or FIG. 2b, with values identical to the ones computed above because of the absence of significant Stokes shift.

For the thinner platelet population, a first narrow bandgap emission line precedes a large red-shifted emission characteristic of deep trap emission readily observed in small CdSe quantum dots.

As it is the case for quantum wells, the absorption spectra of the platelets (FIG. 2a) has two major peaks that correspond to the heavy hale-electron and light hale-electron transitions for n=1, and one step that is attributed to the heavy hale-electron transition for n=2. These features correspond to the platelet population emitting at 2.42 eV, which, in this case, is the dominant population. The contributions of the other populations are visible as small bumps at 2.25 eV and 2.68 eV.

Based on these optical and structural observations, the inventors propose that the platelet formation occurs through formation of small zinc-blende CdSe seeds followed by extremely rapid precursor reaction mediated by the acetate salt. The platelet thickness seems to be fixed by the size of the CdSe seed.

When the acetate salt is present in the starting solution at room temperature, only large CdSe films emitting mostly at 460 nm are synthesized, and the later the acetate salt is introduced the thicker the platelets.

When the acetate salt is introduced after large CdSe (diameter>3 nm) seeds are formed, the inventors do not see evidence of platelets formation anymore, but extremely large and polydisperse zinc blende CdSe quantum dots are formed. In contrast, re-injection of precursors in a platelets solution does not alter the platelets thickness, but rather modifies the absorption and emission intensity of the different platelets populations already present in solution.

The inventors further assume that the adsorption of the myristate to two parallel facets of the zinc-blende seeds lowers strongly their energy, and that the growth proceeds only perpendicular to these two facets on higher energy surfaces. The smaller the CdSe seed, the faster the lateral platelet extension, indicating that thin edges have higher energy than thicker ones.

The control of the platelet thickness at the atomic level is a "natural" consequence of the growth process, and while the inventors cannot exclude thickness variation in a platelet as in the case of quantum well growth as disclosed in reference [22], the spectroscopic data the inventors have obtained strongly suggest that most of the platelet synthesized have uniform thickness. The crucial role of lead acetate salt in the shape control of PbSe nanocrystals has already been documented, for example in Houtepen, A. J. et al., The hidden role of acetate in the PbSe nanocrystal synthesis. J Am Chem Soc 128, 6792-6793 (2006) [23], and the inventors expect that the synthesis the inventors have developed for CdSe nanoplatelets can be generalized to other semiconductor compounds.

Single platelet fluorescence emission is easily visualized using a fluorescent microscope and a mercury lamp as the excitation source. To the eye, they appear as extremely bright source of light with strong blinking and low resistance to photobleaching, as for CdSe quantum dots. It will be interesting to see whether core/shell platelets structure can be synthesized.

Such structures should have increased resistance to photobleaching and reduced blinking as disclosed in Mahler, B. et al. Towards non-blinking colloidal quantum dots. Nature Materials 7, 659-664 (2008) [24]. They would be the equivalent of quantum wells hetero structures. However, lattice mismatch between the core and the shell will induce mechanical constraints as disclosed in Vandermerwe, J. H. Crystal Interfaces 0.2. Finite Overgrowths. J Appl Phys 34, 123-& (1963) [25] on the platelets that could result in buckling and twisting.

Colloidal platelets with thickness tunable at the atomic level and controlled lateral dimensions should be useful to test the predictions made for 20 quantum boxes as disclosed in Bryant, G. W., Excitons in Quantum Boxes—Correlation-Effects and Quantum Confinement. Phys Rev B 37, 8763-8772 (1988) [26]. For example, the oscillator strength of platelets is predicted to increase strongly as the lateral confinement of the exciton increases This phenomenon has been observed in CuCl as disclosed in Nakamura, A. et al., Size-Dependent Radiative Decay of Excitons in CuCl Semiconducting Quantum Spheres Embedded in Glasses. Phys Rev B 40, 8585-8588 (1989) [27] quantum dots but not in quantum platelets yet.

This enhanced oscillator strength gives rise to interesting non-linear properties as disclosed in Chemla, O. S. & Miller, D. A. B. Room-Temperature Excitonic Nonlinear-Optical Effects in Semiconductor Quantum-Weil Structures. J. Opt. Soc. Am. 8-Opt. Phys. 2, 1155-1173 (1985) [28] and may be applied with these colloidal platelets to make effective non linear optical device. The growth of multiple quantum wells lead to the development of several applications including quantum cascade lasers as disclosed in Faist, J. et al. Quantum Cascade Laser. Science 264, 553-556 (1994) [29]. The inventors think that stacking of platelets could lead to similar devices, especially I core/shell platelets can be synthesized and electrically coupled.

Example 4: Manufacture of a CdS Material According to the Present Invention

The CdS platelets.

In a three neck flask 170 mg of Cd(myristate)2 (0.3 mmol), 55 mg of Zn(Ac)$_2$ (0.3 mmol), 1.5 ml of SODE at 0.1M (0.15 mmol) and 13.5 ml of octadecene were introduced and degassed under vacuum for 30 minutes. Then the mixture was heated at 180° C. under Argon flow for 10 minutes. Then the nanocrystals are precipitated in ethanol and suspended in hexane.

They are not soluble in hexane.

Example 5: Manufacture of a CdTe Material According to the Present Invention

In a three neck flask 400 mg of Cd(acetate)$_2$XH20, 150 microliter of oleic acid and 10 ml of octadecene were introduced and degassed under vacuum for 30 minutes at 100° C. Then the mixture was heated at 150° C. under Argon flow and 150 microliter TOPTe (TOP=trioctylphosphine) 1M were injected. React for 10 minutes at 180° C. After removing the heating mantle and going back to room temperature, the nanocrystals were precipitated in ethanol and suspended in hexane or THF.

Example 6: Examples of Manufacture of CdSe with Octadecene (ODE=Octadecene)

1) Cd(myristate)$_2$, Se mesh and ODE were introduced in a degassed container and heated up to temperature of 240° C.; when the temperature reached 190° C., the acetate salt, for example Zn(Ac)$_2$, Cd(Ac)$_2$, xH$_2$O or Mn(Ac)$_2$, xH$_2$O was introduced. Depending on the proportions, platelets that emit with maxima at 460 nm, 510 nm or 550 nm were obtained.
2) Cd(myristate)$_2$, Se mesh, acetate salt, for example Zn(Ac)$_2$, Cd(Ac)$_2$, xH$_2$O or Mn(Ac)$_2$, xH$_2$O, and ODE were introduced in a degassed container. Heating at a temperature of from 180° C. to 240° C.
3) Cd(acetate)$_2$, oleic acid and ODE in a degassed container, with heating and intensive agitation. Temperature of 170° C., and introducing TOPSe. Reanneal at 220° C. allows reducing the deep trap.
4) Se mesh, oleic acid and ODE in a degassed container. Temperature of 240° C. and adding Cd(Ac)$_2$. Reannealing 20 minutes at 240° C. Thick platelets are obtained.
5) Cd Acetate, selenium mesh and ODE were introduced in a degassed container, with heating and intensive agitation. Temperature of 170° C., and introducing Oleic acid. Reanneal at 220° C. allows reducing the deep trap.

Example 7: Lateral Growth of CdSe Platelets

CdSe platelets were synthesized according to example 1. At the end of the synthesis and once the content of the flask was cooled, 1 ml of oleic acid and hexane were injected and then mixture was centrifuged. The supernatant containing the quantum dots was eliminated and the precipitate was suspended in hexane. Each time the medium was cloudy, it was centrifuged and the platelets were recovered from the supernatant. This process was carried out several times in order to recover a maximum amount of platelets emitting at 510 nm. The insoluble portion seemed to be the excess of Cd(myr).

The platelets were suspended again in 10 mL of hexane. 3 mL of a solution of CdSe platelets, 3 mL of ODE, 28 mg (0.15 mmol) of Zn(Ac)$_2$, and 43 mg (0.075 mmol) of Cd(myr)$_2$, were introduced in a round bottom flask. The flask was degassed at room temperature (20° C.) and then put under Argon.

The temperature was set at 200° C. 3.5 mL of trioctylamine, 43 mg of Cd(myr)$_2$ and 1.5 mL of SeODE at 0.1M were injected by a syringe at a rate of 3 ml/h. Prior to the injection, the mixture of trioctylamine and Cd(myr)$_2$ was heated in order to solubilize Cd(myr)$_2$.

This additional post-synthetic step allows the platelets to continue growing laterally in solution after their synthesis. It is a proof that platelets, with controlled thicknesses tuned at atomic level, with dimensions up to a meter or more may be synthesized.

Example 8: Synthesis of CdSe 460 NPLs 240 mg of Cd(OAc)2 (0.9 mmol), 31 mg of Se mesh, 150 µL OA and 15 ml of ODE are introduced in a three neck flask and are degassed under vacuum. The mixture is heated under argon flow at 180° C. for 30 min.

Example 9: Synthesis of CdSe 510 NPLs 170 mg of $Cd(myr)_2$ (0.3 mmol), 12 mg of Se mesh and 15 ml of ODE are introduced in a three neck flask and are degassed under vacuum. The mixture is heated under argon flow at 240° C., when the temperature reaches 195° C., 40 mg of $Cd(Ac)_2$ (0.15 mmol) are introduced. The mixture is heated for 10 minutes at 240° C.

Example 10: Synthesis of CdSe 550 NPLs 170 mg of $Cd(myr)_2$ (0.3 mmol) and 15 ml of ODE are introduced in a three neck flask and are degassed under vacuum. The mixture is heated under argon flow at 250° C. and 1 ml of a solution of Se sonicated in ODE (0.1M) are quickly injected. After 30 seconds, 80 mg of $Cd(Ac)_2$ (0.3 mmol) are introduced. The mixture is heated for 10 minutes at 250° C.

Example 11: Synthesis of CdTe 428 NPLS

A three neck flask is charged with 130 mg of $Cd(prop)_2$ (0.5 mmol), 80 μL of OA (0.25 mmol), and 10 mL of ODE, and the mixture is magnetically stirred and degassed under vacuum at 95° C. for 2 h. The mixture under argon is heated at 180° C. and 100 μL of a solution of 1 M TOPTe diluted in 0.5 mL of ODE are swiftly added. The color of the solution changes rapidly and becomes yellow. Aliquots are taken at different stages of the reaction to follow it spectroscopically. The reaction is performed for 20 min at the same temperature. OA (1 mL) is added to the solution, and the heating mantle is quickly removed. At room temperature, 30 mL of hexane and 40 mL of ethanol are added to the crude reaction mixture. Nanoplatelets are then precipitated through centrifugation for 10 min at 5000 rpm. The supernatant is discarded, and the solid precipitate is redispersed in hexane. The precipitation process is repeated two or three times.

When 428 NPLs are prepared using Cd(OAc)2, TOP-Te 1 M is injected between 120 and 140° C.

Example 12: Synthesis of CdTe 500 NPLS

A three-neck flask is charged with 130 mg of $Cd(prop)_2$ (0.5 mmol), 80 μL of OA (0.25 mmol), and 10 mL of ODE, and the mixture is magnetically stirred and degassed under vacuum at 95° C. for 2 h. The mixture under argon is heated at 210° C., and 100 μL of a solution of 1 M TOP-Te diluted in 0.5 mL of ODE is swiftly added. The color of the solution changes rapidly to become yellow and then yellow-orange. The reaction is heated for 30 min at the same temperature. Then, 1 mL of OA is added to the solution, and the heating mantle is quickly removed. At room temperature, 30 mL of hexane and 40 mL of ethanol are then added to precipitate the NPLs. The solution is then centrifuged for 10 min at 5000 rpm. The supernatant is discarded and the solid precipitate is redispersed in hexane. The precipitation process with the ethanol is repeated two or three times.

When Cd(OAc)2 was used as cadmium precursor, TOP-Te is injected between 170 and 190° C.

Example 13: Synthesis of CdTe 500 NPLS with Continuous Injection

A mixture of 160 mg $Cd(OAc)_2.2(H_2O)$ (0.6 mmol) and 95 μL OA (0.3 mmol) in 25 mL of ODE is charged into a three-neck flask and stirred under vacuum for 1 h at 95° C. The flask is filled with Ar, and the temperature is increased to 200° C. Then, 0.1 mmol of stoichiometric TOP-Te (2.24 M) diluted in 5 mL ODE is injected with a syringe pump at a constant rate over 30 min. When the addition is completed, the reaction is heated at 200° C. for 15 min Hexane (30 mL) and ethanol (30 mL) are added to the crude product, and the NPLs are precipitated by centrifugation at 3500 rpm and then redissolved in hexane or toluene.

Example 14: Synthesis of CdTe 556 NPLS

In a typical reaction, 133 mg of $Cd(OAc)_2$ (0.5 mmol), 255 μL of OA (0.8 mmol), and 25 mL of ODE are charged into a three-neck flask, and the mixture is stirred and degassed under vacuum at 95° C. for 2 h. The flask is filled with argon and the temperature is increase to 215° C. Then, 0.05 mmol of stoichiometric TOP-Te (2.24 M) diluted in 2.5 mL ODE is injected with a syringe pump at a constant rate over 15 min. When the addition is completed, the reaction is heated for 15 min.

REFERENCES

[1] Yin, Y. & Alivisatos, A. P. Colloidal nanocrystal synthesis and the organic-inorganic interface. Nature 437, 664-670 (2005).
[2] Hu, J. T., Odom, T. W. & Lieber, C. M. Chemistry and physics in one dimension: Synthesis and properties of nanowires and nanotubes. Accounts Chem Res 32, 435-445 (1999).
[3] Geim, A. K. & Novoselov, K. S. The rise of graphene. Nature Materials 6, 183-191 (2007).
[4] Murray, C. B., Norris, D. J. & Bawendi, M. G. Synthesis and Characterization of Nearly Monodisperse Cde (E=S, Se, Te) Semiconductor Nanocrystallites. J Am Chem Soc 115, 8706-8715 (1993).
[5] Duan, X. F. & Lieber, C. M. General synthesis of compound semiconductor nanowires. Adv Mater 12, 298-302 (2000).
[6] Peng, X. G. et al. Shape control of CdSe nanocrystals. Nature 404, 59-61 (2000).
[7] Weisbuch, C. & Vinter, B. Quantum Semiconductor Structures fundamentals and applications. (Academie Press, 1991).
[8] Morales, A. M. & Lieber, C. M. A laser ablation method for the synthesis of crystalline semiconductor nanowires. Science 279, 208-211 (1998).
[9] Jun, Y. W., Choi, J. S. & Cheon, J. Shape control of semiconductor and metal oxide nanocrystals through non-hydrolytic colloidal routes. Angew Chem/nt Edit 45, 3414-3439 (2006).
[10] Michalet, X. et al. Quantum dots for live cells, in vivo imaging, and diagnostics. Science 307, 538-544 (2005).
[11] Hines, M. A. & Guyot Sionnest, P. Synthesis and characterization of strongly luminescing ZnS-Capped CdSe nanocrystals. J Phys Chem-Us 100, 468-471 (1996).
[12] Redl, F. X., Cho, K. S., Murray, C. B. & O'Brien, S. Three-dimensional binary superlattices of magnetic nanocrystals and semiconductor quantum dots. Nature 423, 968-971 (2003).
[13] Caruge, J. M., Halpert, J. E., Wood, V., Bulovic, V. & Bawendi, M. G. Colloidal quantum-dot light-emitting diodes with metal-oxide charge transport layers. Nat. Photonics 2, 247-250 (2008).
[14] Puntes, V. F., Zanchet, D., Erdonmez, C. K. & Alivisatos, A. P. Synthesis of hep-Co nanodisks. J Am Chem Soc 124, 12874-12880 (2002).

[15] Xu, R., Xie, T., Zhao, Y. G. & Li, Y. D. Single-crystal metal nanoplatelets: Cobalt, nickel, copper, and silver. Cryst. Growth Des. 7, 1904-1911 (2007).
[16] Si, R., Zhang, Y. W., You, L. P. & Yan, C. H. Rare-earth oxide nanopolyhedra, nanoplates, and nanodisks. Angew Chem/nt Edit 44, 3256-3260 (2005).
[17] Sigman, M. B. et al. Solventless synthesis of monodisperse Cu2S nanorods, nanodisks, and nanoplatelets. J Am Chem Soc 125, 16050-16057 (2003).
[18] Ghezelbash, A., Sigman, M. B. & Korgel, B. A. Solventless synthesis of nickel sulfide nanorods and triangular nanoprisms. Nana Letters 4, 537-542 (2004).
[19] Yang, Y. A., Wu, H. M., Williams, K. R. & Cao, Y. C. Synthesis of CdSe and CdTe nanocrystals without precursor injection. Angew Chem/nt Edit 44, 6712-6715 (2005).
[20] Kim, Y. D. et al. Optical-Properties of Zinc blende Cdse and Zn(X)Cd(1-X)Se Films Grown on Gaas. Phys Rev B 49, 7262-7270 (1994).
[21] Norris, D. J. & Bawendi, M. G. Measurement and assignment of the size-dependent optical spectrum in CdSe quantum dots. Phys Rev B 53, 16338-16346 (1996).
[22] Bastard, G., Delalande, C., Meynadier, M. H., Frijlink, P. M. & Voos, M. Law-Temperature Exciton Trapping on Interface Defects in Semiconductor Quantum Wells. Phys Rev B 29, 7042-7044 (1984).
[23] Houtepen, A. J., Koole, R., Vanmaekelbergh, D. L., Meeldijk, J. & Hickey, S. G. The hidden role of acetate in the PbSe nanocrystal synthesis. J Am Chem Soc 128, 6792-6793 (2006).
[24] Mahler, B. et al. Towards non-blinking colloidal quantum dots. Nature Materials 7, 659-664 (2008).
[25] Vandermerwe, J. H. Crystal Interfaces. 2. Finite Overgrowths. J Appl Phys 34, 123-& (1963).
[26] Bryant, G. W. Excitons in Quantum Boxes—Correlation-Effects and Quantum Confinement. Phys Rev B 37, 8763-8772 (1988).
[27] Nakamura, A., Yamada, H. & Tokizaki, T. Size-Dependent Radiative Decay of Excitons in Cucl Semiconducting Quantum Spheres Embedded in Glasses. Phys Rev B 40, 8585-8588 (1989).
[28] Chemla, O. S. & Miller, D. A. B. Room-Temperature Excitonic Nonlinear-Optical Effects in Semiconductor Quantum-Weil Structures. J. Opt. Soc. Am. 8-Opt. Phys. 2, 1155-1173 (1985).
[29] Faist, J. et al. Quantum Cascade Laser. Science 264 (5158), 553-556 (1994).
[30] Han, M. Y., Gao, X. H., Su, J. Z. & Nie, S. Quantum-dot-tagged microbeads for multiplexed optical coding of biomolecules. Nat Biotechno/19, 631-635 (2001).
[31] Y. Wu, C. Wadia, W. L. Ma, B. Sadtler, A. P. Alivisatos, Nano Letters 8, 2551 (August, 2008).
[32] D. Todorovsky et al., Journal of the University of Chemical Technology and Metallurgy, 41, 1, 2006, 93-96.

The invention claimed is:

1. A colloidal material comprising semiconductor nanocrystals of formula $A_nX_m$, wherein
A is selected from group consisting of Ib, IIa, IIb, IIIa, IIIb, IVa, IVb, Va, Vb, VIb, VIIb, VIII and mixtures thereof;
X is selected from group consisting of Va, VIa, VIIa and mixtures thereof;
n and m are independently a decimal number from 0 to 5, but not equal to 0 so that the semiconductor nanocrystals include both A and X;
wherein said semiconductor nanocrystals have a quasi 2D structure, wherein the smallest dimension is smaller than the other two dimensions by a factor of at least 1.5; and
wherein the faces normal to the smallest dimension consist either of A or X.

2. The colloidal material according to claim 1, wherein the smallest dimension of the semiconductor nanocrystals comprises an alternate of atomic layers of A and X.

3. The colloidal material according to claim 1, wherein
A is selected from the group consisting of Zn, Cd, Hg, Cu, Ag, Au, Ni, Pd, Pt, Co, Fe, Ru, Os, Mn, Tc, Re, Cr, Mo, W, V, Nd, Ta, Ti, Zr, Hf, Be, Mg, Ca, Sr, Ba, Al, Ga, In, Tl, Si, Ge, Sn, Pb, As, Sb, Bi, Sc, Y, La, Ce, Pr, Nd, Sm, Eu, Gd, Tb, Dy, Ho, Er, Tm, Yb and a mixture thereof, and
X is selected from the group consisting of O, S, Se, Te, N, P, As, Sb, F, Cl, Br, I and a mixture thereof.

4. The colloidal material according to claim 1, wherein the semiconductor nanocrystals are selected from the group consisting of a IIb-VIa, IVa-VIa, Ib-IIIa-VIa, IIb-IVa-Va, Ib-VIa, VIII-VIa, IIb-Va, IIIa-VIa, IVb-VIa, IIa-VIa, IIIa-Va, IIIa-VIa, VIb-VIa, and Va-VIa semiconductor.

5. The colloidal material according to claim 1, wherein the semiconductor nanocrystals are selected from the group consisting of CdS, CdSe, CdTe, ZnS, ZnSe, ZnTe, HgS, HgSe, HgTe, HgO, GeS, GeSe, GeTe, SnS, SnSe, SnTe, PbS, PbSe, PbTe, $GeS_2$, $GeSe_2$, $SnS_2$, $SnSe_2$, $CuInS_2$, $CuInSe_2$, $AgInS_2$, $AgInSe_2$, CuS, $Cu_2S$, $Ag_2S$, $Ag_2Se$, $Ag_2Te$, FeS, $FeS_2$, InP, $Cd_3P_2$, $Zn_3P_2$, CdO, ZnO, FeO, $Fe_2O_3$, $Fe_3O_4$, $Al_2O_3$, $TiO_2$, MgO, MgS, MgSe, MgTe, AlN, AlP, AlAs, AlSb, GaN, GaP, GaAs, GaSb, InN, InP, InAs, InSb, TlN, TlP, TlAs, TlSb, $MoS_2$, PdS, $Pd_4S$, $WS_2$ and a mixture thereof.

6. The colloidal material according to claim 1, wherein the semiconductor nanocrystals are nanosheets.

7. The colloidal material according to claim 1, wherein the semiconductor nanocrystals have a thickness tuned at the atomic level.

8. The colloidal material according to claim 1, wherein the semiconductor nanocrystals have a thickness selected from the group consisting of about 0.3 nm to about 10 mm, about 0.3 nm to about 1 mm, about 0.3 nm to about 100 µm, about 0.3 nm to about 10 µm, about 0.3 nm to about 1 µm, about 0.3 nm to about 500 nm, about 0.3 nm to about 250 nm, about 0.3 nm to about 100 nm, about 0.3 nm to about 50 nm, about 0.3 nm to about 25 nm, about 0.3 nm to about 20 nm, about 0.3 nm to about 15 nm, about 0.3 nm to about 10 nm, and about 0.3 nm to about 5 nm.

9. The colloidal material according to claim 1, wherein the smallest dimension of the semiconductor nanocrystals is smaller than the other two dimensions by a factor of at least 2.

10. The colloidal material according to claim 1, wherein at least one of the two other dimensions of the semiconductor nanocrystals is within a range selected from the group consisting of 2 nm to 1 m, 2 nm to 100 mm, 2 nm to 10 mm, 2 nm to 1 mm, 2 nm to 100 µm, 2 nm to 10 µm, 2 nm to 1 µm, 2 nm to 100 nm, 2 nm to 50 nm, 2 nm to 20 nm, and 2 nm to 10 nm.

11. A semiconducting thin film comprising the colloidal material according to claim 1.

12. An optoelectronic device comprising the colloidal material according to claim 1.

13. A laser comprising the colloidal material according to claim 1.

14. A photovoltaic cell comprising the colloidal material according to claim 1.

15. A diode or a light emitting diode comprising the colloidal material according to claim 1.

16. A display comprising the colloidal material according to claim 1.

* * * * *